(12) United States Patent
Bannwolf et al.

(10) Patent No.: US 8,010,037 B2
(45) Date of Patent: Aug. 30, 2011

(54) SYSTEM, PROGRAM PRODUCT, AND RELATED METHODS FOR MANAGING CHILD ACTIVITIES

(76) Inventors: Kevin J. Bannwolf, San Antonio, TX (US); Edmund G. Regina, Hyde Park, MA (US)

( * ) Notice: Subject to any disclaimer, the term of this patent is extended or adjusted under 35 U.S.C. 154(b) by 884 days.

(21) Appl. No.: 12/021,992

(22) Filed: Jan. 29, 2008

(65) Prior Publication Data

US 2008/0182232 A1   Jul. 31, 2008

Related U.S. Application Data

(60) Provisional application No. 60/914,803, filed on Apr. 30, 2007, provisional application No. 60/886,961, filed on Jan. 29, 2007.

(51) Int. Cl.
*G09B 3/00* (2006.01)
(52) U.S. Cl. ........................................ 434/350
(58) Field of Classification Search ............... 434/322, 434/350
See application file for complete search history.

(56) References Cited

U.S. PATENT DOCUMENTS

| | | | |
|---|---|---|---|
| 5,743,743 A | 4/1998 | Ho et al. | |
| 6,024,572 A | 2/2000 | Weyer | |
| 6,398,218 B1 | 6/2002 | Vancura | |
| 6,678,824 B1 | 1/2004 | Cannon et al. | |
| 7,036,145 B1 | 4/2006 | Murphy et al. | |
| 7,175,521 B2 | 2/2007 | McClintic | |
| 2003/0077559 A1 | 4/2003 | Braunberger | |
| 2003/0207237 A1 | 11/2003 | Glezerman | |
| 2004/0081953 A1 | 4/2004 | Murphy | |
| 2005/0130112 A1 | 6/2005 | Lotvin | |

*Primary Examiner* — Xuan Thai
*Assistant Examiner* — Evan Page

(57) ABSTRACT

A system, program product, and method for managing activities of a child over a communication network are provided. The system can include a communication network, a plurality of user computers in communication with the network, a database server, and an educational enhancement web server in communication with the network and the database server, and including memory storing educational enhancement program product to facilitate managing activities of a child over the communication network. The educational enhancement program product can include instructions, that when executed, cause the educational enhancement web server to perform the operations of providing data to direct an agent resident on a respective child client user computer to interrupt or prevent usage of the computer for a computer-based leisure activity, and to provide data to the child client user computer to display an educational task which must be completed as a prerequisite to receiving control of the computer needed to initiate or resume the computer-based leisure activity.

40 Claims, 15 Drawing Sheets

Parent Welcome and Registration

More Information

Company Logo

To register please complete the following information

First Name....
Last Name....
Address....
....
How many children....
Method of payment....

Submit payment

Back

Complete Registration and Make Payment

Fig. 9

Company Logo

Please supply the following information about your child. It will be used to present the appropriate learning tasks Personal First Name.....
Last Name....
Age...
Username...
Password...
etc.

Academic

Grade...
subjects to test on (check all that apply)
Mathematics ☐  English ☐  History ☐ etc...   All subjects ☐
Level  Standard ○  Challenging ○
etc...

Results...Reward

Failing grade (grade at which your child will not be returned to play): _____

For each grade indicate the number of minutes of play to give as a reward:    100 _____   90____ etc.

Submit Chld Information and Profiles

Fig. 10

Child Greeting

Explanation of Exercises to Child

Company Logo

Fill in the blank

The rain in Spain falls mainly in the _____

Next

If you would like to review the instructions you may go back...

Back

First Question

Fig. 13

Company Logo

Please choose the best answer

The rain in Spain falls mainly in the
- plane
- pane
- seine
- plain

Next

If you would like to change your previous answer you may go back...

Back

Another Question

Fig. 14

End of Exercises

Report of Score that Wins Reward

Report of Score with no Reward

Child Flowchart

Parent Flowchart

SYSTEM, PROGRAM PRODUCT, AND RELATED METHODS FOR MANAGING CHILD ACTIVITIES

RELATED APPLICATIONS

This non-provisional application claims priority to and the benefit of U.S. Patent Application No. 60/914,803 filed on Apr. 30, 2007, titled "Pass2Play Service: Documentation 2007-04-24," and U.S. Patent Application No. 60/886,961 filed on Jan. 29, 2007, titled "Pass2Play," each incorporated herein by reference in its entirety.

BACKGROUND OF THE INVENTION

1. Field of the Invention

The present invention relates generally to control of child activities, and particularly to systems, program product, and methods system for managing and controlling computer-based activities of a child over a communication network.

2. Description of Related Art

Significant advancements in computing technology over the last few decades have resulted in a proliferation of computing devices, both in and outside the home. Particularly, such devices are beginning to replace books as a primary means of distributing educational material, making them a necessary part of a child's academic development. Such computing devices, however, arguably since their inception, have also been able to provide computer-based leisure activities, thus making such computing devices capable of both being an educator and a distraction.

It comes as no surprise that children, including adolescents and young adults, are spending more and more time playing stand-alone computer games, internet based games, visiting chat rooms and blogs, and participating in other computer-based leisure activities on such computing devices, at the expense of doing their studies or exploring more educational pursuits. Further, more and more computing devices capable of providing computer-based leisure activities are becoming more portable, with notebook computers, dedicated game boxes, personal digital assistants (PDAs), cellular telephones, and other hand held and/or wireless communication devices, being but a few examples. As such, more parents are finding it difficult to sufficiently monitor or manage their children's activities, particularly those involving using such devices. Unfortunately, due to an apparent societal reliance on such devices, merely taking such devices away would not seem to be either an adequate solution, or one being capable of implementation.

Various systems have been introduced to help balance the children's desire for leisure with their parents' desire for more educational pursuits. For example, various systems have been developed which add educational enhancements to various computer games. Such enhancements can include the incorporation of a flash card module in the game code of the game, which can suspend a game's play by displaying a flash card that must be answered in order to resume game play. Other systems have been developed which utilize a locally resident access filter resident on the computing device to prevent or limit access to computer peripheral input devices required by entertainment programs, while simultaneously allowing unlimited access to such devices for accessing study programs that present study materials. Still other systems utilize a locally resident application usage time limiter program which collectively limits an amount of time spent on certain preconfigured leisure-type application programs.

Still further, other systems have been developed which include a locally resident access control software program installed on the computing device, which monitors the child's computer game play, and periodically, at intervals set by the parent, interrupts the activity to present questions to the child. Upon completion of the questions, the child is allowed by the access control program to return to the play for a period of time determined by the score as configured by the parent. The access control software program also manages a local database of questions stored on a local hardware module and presents them to the child. The questions are created by the parent or downloaded by the parent for storage in the database. The supply of downloaded questions is provided by an exchange server that allows parents to exchange the various questions that they create.

Such system or systems require substantially all of its functionality to be carried out by the locally resident software on the computing device that the child uses to play, including, for example, installation and configuration of the resident access control software program, timing of play periods and interruptions for quizzes, presentation of the questions by the access control software program from the local store of questions, setting of questions customization parameters, storing the questions, collecting and reporting of performance information, and sharing personally created questions with other parents. In such system, configuration of the parameters of the service, e.g., duration of playtime and educational task characteristics, is done by the parent locally on the child's device. That is, configuration is accomplished while the child is not using the computer or other device. Further, adding new configuration parameters would require additional software upgrades and interruption of use. Still further, local storage and management of the questions database, by such systems, limits the type of devices that can support such systems, and places severe constraints on the quantity, variety and flexibility of such presentations. Further, such systems require parents to create the questions and/or relies on other parents to exchange questions, which are downloaded for storage and use locally. Most parents would not, however, be expected to have the ability to develop sufficiently challenging questions at the right level for the particular child.

Accordingly, recognized by Applicants is the need for a system, program product, and methods which provide remote control of parameters, such as timing of play periods and interruptions, to prevent manipulation by the child, to permit greater flexibility of the control parameters, to allow seamless upgrade of control parameters, and to allow real-time control. Also recognized by Applicants is the need for a system, program product, and methods which can allow configuration of those parameters remote from the child's device, at any time, and which can allow adding new configuration parameters, at any time, without the installation of additional software by the parent. Also recognized by Applicants is the need for a system, program product, and methods which provide professionally developed, centrally managed and stored, and appropriately selected educational tasks, tailored to the child.

SUMMARY OF THE INVENTION

In view of the foregoing, embodiments of the present invention advantageously include a system, program product, and methods of managing activities of a child over a communication network to form a balance between computer-based leisure activities and computer-based educational activities. To this end and to overcome the difficulties of prior systems, embodiments of the present invention advantageously can also include a system, program product, and methods which provide remote control of parameters such as timing of play periods and interruptions to thereby prevent manipulation by the child, permit greater flexibility of the control parameters, allow seamless upgrade of control parameters, and allow real-time control. Embodiments of the present invention can also advantageously include a system, program product, and methods which allow configuration of those parameters remotely from the child's device, at any time, even while the child is using the play device, and which can allow adding new configuration parameters, at any time, without the installation of additional software by the parent. Embodiments of the present invention can also advantageously include a system, program product, and methods which provide professionally developed, centrally managed and stored, and appropriately selected educational tasks, tailored to the child, which the child must consummate in order to receive an allotment of "play time" as a reward as set according to parameters provided by the parent.

Particularly, in order to further overcome the difficulties of prior systems, embodiments of the present invention advantageously can present educational tasks to a child over the Internet within the context of his or her ongoing leisure activity on a computer or other digital processing and communication device, such as, dedicated game boxes or hand held communication devices, etc., to thereby enhance the educational benefit from the educational tasks by rewarding the child with time and freedom to continue with computing device play. Advantageously, such educational tasks can include quizzes, reading comprehension tests, and other types of academic or practical educational tasks, which can be presented while the child is otherwise occupied with computer leisure activities such as locally resident or internet based games, chat rooms, blogs, and/or other entertainment activities. Advantageously, according to embodiments of the present invention, computer leisure activities can be interrupted and the browser can be directed to a website which presents one or more educational tasks, upon completion of which, the child's computer is enabled to initiate or return to interrupted leisure activity.

More specifically, embodiments of the present invention advantageously provide a system for managing activities of a child over a communication network. For example, a system according to an embodiment of the present invention includes a communication network, at least one computer hosting an online educational enhancement web site accessible to the communication network to define an educational enhancement web server, at least one computer in communication with the educational enhancement web server to provide database management services thereto to define a database server, and at least one database accessible to the processor of the database server and having a plurality of child client user records associated with a corresponding plurality of child client users, and associated with at least one parent client user. The system also includes a plurality of child client user computers each positioned at a respective plurality of child client user sites remote from the educational enhancement web server and accessible to the communication network, and having: a processor, memory coupled to the processor to store operating instructions therein and to receive data from the educational enhancement web server, a display in communication with the processor to display data using an associated web browser, and a user interface in communication with the processor to provide the child client user with on-line web-based access to the educational enhancement web server over the communication network. The memory of each child client user computer also includes an educational enhancement agent adapted to receive commands from the educational enhancement web server to interrupt or resume at least one application program adapted to provide a computer-based leisure activity.

The system also includes educational enhancement program product stored in the memory of the educational enhancement web server to facilitate managing activities of a child over a communication network. The educational enhancement program product includes instructions that when executed by the educational enhancement web server, causes the educational enhancement web server to perform the operations of receiving data from a child client user computer identifying a child client user, providing data to the child client user computer to display a first educational task required to be completed to allow access to at least one application program adapted to provide the respective child client user a computer-based leisure activity, providing data to direct the educational enhancement agent to allow access to the at least one application program responsive to child client user satisfaction of access criteria, providing data to direct the educational enhancement agent to interrupt the computer-based leisure activity to define an interrupt order responsive to a permissive access time limit, providing data to the child client user computer to display a second educational task required to be completed to allow access of the interrupted computer-based leisure activity, and providing data to direct the educational enhancement agent to resume the computer-based leisure activity responsive to child client user satisfaction of access criteria.

Embodiments of the present invention include methods for managing activities of a child over a communication network. For example, a method according to an embodiment of the present invention includes the steps of receiving data through a communication network from a child client user computer identifying a respective child client user, and providing data through the communication network to the child client user computer to thereby display an educational task required to be completed to allow access to at least one application program adapted to provide the child client user a computer-based leisure activity. The method can also include the steps of receiving educational task completion data for the educational task provided to the child client user, evaluating educational task performance of the child client user responsive to completion of the educational task to determine if the child client user satisfied associated access criteria to thereby determine an amount of permissive access time for computer-based leisure activities prior to a next interrupt, and directing an educational enhancement agent residing on a child client user computer through the communication network to allow access to the at least one application program responsive to child client user satisfaction of access criteria.

The method can also include the steps of remotely monitoring expended permissive access time to thereby determine when to direct the educational enhancement agent to interrupt the computer-based leisure activity, directing the educational enhancement agent through the communication network to interrupt the computer-based leisure activity responsive to a permissive access time limit, and dynamically selecting educational task items from at least one database responsive to at least two of the following: the permissive access time limit, data stored in a child client user record for the respective child client user, and performance on prior educational task items by the child client user. The method can also include the steps of providing data through the communication network to the child client user computer to thereby display a second educational task required to be completed to allow resumption of the interrupted computer-based leisure activity; and directing the educational enhancement agent through the communication network to resume the computer-based leisure activity responsive to child client user satisfaction of access criteria.

Also for example, a method according to another embodiment of the present invention includes the steps of directing an educational enhancement agent residing on a child client user computer through a communication network to interrupt an application program providing a respective child client user a computer-based leisure activity responsive to a permissive access time limit, providing data through the communication network to the child client user computer to thereby display an educational task required to be completed to allow resumption of the interrupted computer-based leisure activity; and directing the educational enhancement agent through the communication network to allow resumption of the computer-based leisure activity responsive to child client user satisfaction of access criteria. The method can also include the steps of receiving educational task completion data for the educational task provided to the child client user, evaluating educational task performance of the child client user responsive to completion of the educational task to determine if the child client user satisfied associated access criteria to thereby determine an amount of permissive access time for computer-based leisure activities prior to a next interrupt, determining an amount of awarded permissive access time, and remotely monitoring expended permissive access time to thereby determine when to direct the educational enhancement agent through the communication network to interrupt the computer-based leisure activity.

Embodiments of the present invention include computer readable media that is readable by a computer for managing activities of a child over a communication network. For example, a computer readable medium according to an embodiment of the present invention can include instructions that when executed by computer, cause the computer to perform the operations of receiving data through a communication network from a child client user computer identifying a respective child client user, and providing data through the communication network to the child client user computer to display an educational task required to be completed to allow access to at least one application program adapted to provide the child client user a computer-based leisure activity. The operations can also include receiving educational task completion data for the educational task provided to the child client user, evaluating educational task performance of the child client user responsive to completion of the educational task to determine if the child client user satisfied associated access criteria to thereby determine an amount of permissive access time for computer-based leisure activities prior to a next interrupt, and providing data through the communication network to direct an educational enhancement agent residing on a child client user computer to allow access to the at least one application program responsive to child client user satisfaction of access criteria.

The operations can also include remotely monitoring expended permissive access time to thereby determine when to provide the data to direct the educational enhancement agent to interrupt the computer-based leisure activity, providing such data through the communication network to direct the educational enhancement agent to interrupt the computer-based leisure activity to define an interrupt order responsive to a permissive access time limit, and dynamically selecting educational task items from at least one database responsive to at least two of the following: the permissive access time limit, data stored in a child client user record for the respective child client user, and performance on prior educational task items by the child client user. The operations can also include providing data through the communication network to the child client user computer to thereby display a second educational task required to be completed to allow resumption of the interrupted computer-based leisure activity; and providing data through the communication network to direct the educational enhancement agent to resume the computer-based leisure activity responsive to child client user satisfaction of access criteria.

Also for example, a computer readable medium according to another embodiment of the present invention can include instructions that when executed by a computer, cause the computer to perform the operations of providing data through a communication network to direct an educational enhancement agent residing on a child client user computer to interrupt an application program providing a respective child client user a computer-based leisure activity responsive to a permissive access time limit, providing data through the communication network to the child client user computer to thereby display an educational task required to be completed to allow resumption of the interrupted computer-based leisure activity; and providing data through the communication network to the child client user computer to display an educational task required to be completed to allow resumption of the interrupted computer-based leisure activity. The operations can also include receiving educational task completion data the educational task provided to the child client user, evaluating educational task performance of the child client user responsive to completion of the educational task to determine if the child client user satisfied associated access criteria to thereby determine an amount of permissive access time for computer-based leisure activities prior to a next interrupt, determining an amount of awarded permissive access time, and remotely monitoring expended permissive access time to thereby determine when to direct the educational enhancement agent through the communication network to interrupt the computer-based leisure activity.

Advantageously, embodiments of the present invention can provide a system which includes functionality at both a remote server level and at a local child client user computer level. At the child client user computer level, the program product can include a program module that on the basis of the child's login identity can put the operating environment into a restricted state where the child's access to other programs is limited to those which are selected by the parent. The program product can also include a browser with restricted navigational functionality, and a local agent that receives commands from a website to interrupt or resume the child's play, and that directs a browser to the educational website and maintains and limits navigation to pages of the website. At the remote server level, the program product can include program modules that direct the agent to interrupt or resume the child's play; that present web pages custom-configured to the particular child that welcome and orient the child and instruct the child on carrying out the educational tasks; that present collections of dynamically selected educational task items based on the child's personal profile as submitted by the parent and the child's history of completion of previous educational tasks; that evaluate the child's performance on the educational tasks and calculate the rewarded time for the child's subsequent play interval; and that collect and store the child's grades on educational tasks. A website repository of educational task items organized by characteristics such as grade/age level, subject matter, difficulty and task type, e.g., multiple choice or fill-in-the-blank quizzes, mathematical skill problems, reading comprehension, and other types of academic and practical educational tasks, is also provided.

The program product can also include one or more program modules that manage interactions with the parent subscriber, the functions of which include: answering inquiries about the activity management services, subscribing the parent and children, installing the agent program, collecting and store data regarding the parent's choices for customizing the educational tasks and performance based reward schedules to direct to the agent program, providing online reporting of child's performance, providing online reporting of child's real-time activity such as educational task completion and sites currently visited, providing a history online or via email of the child's performance on educational tasks, providing information regarding performance in comparison to the other children, and providing a history of the child's computer leisure activity such as time spent and sites visited. According to an embodiment of the present invention, a secure administrative database that stores and manages information about the subscribing parent and the subscribed children, and server side software (e.g., middleware) that manages the educational task database, the subscriber database, and that integrates the information between these databases and passes information between the databases and the web portals, is also provided.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 9 is a schematic block diagram of a graphical user interface illustrating a registration web page according to an embodiment of the present invention;

FIG. 10 is a schematic block diagram of a graphical user interface illustrating a web page for entering child information and profile data according to an embodiment of the present invention;

FIGS. 13-15 are schematic block diagrams of a graphical user interface illustrating educational task presentation web pages according to an embodiment of the present invention;

DETAILED DESCRIPTION

Figure 1:
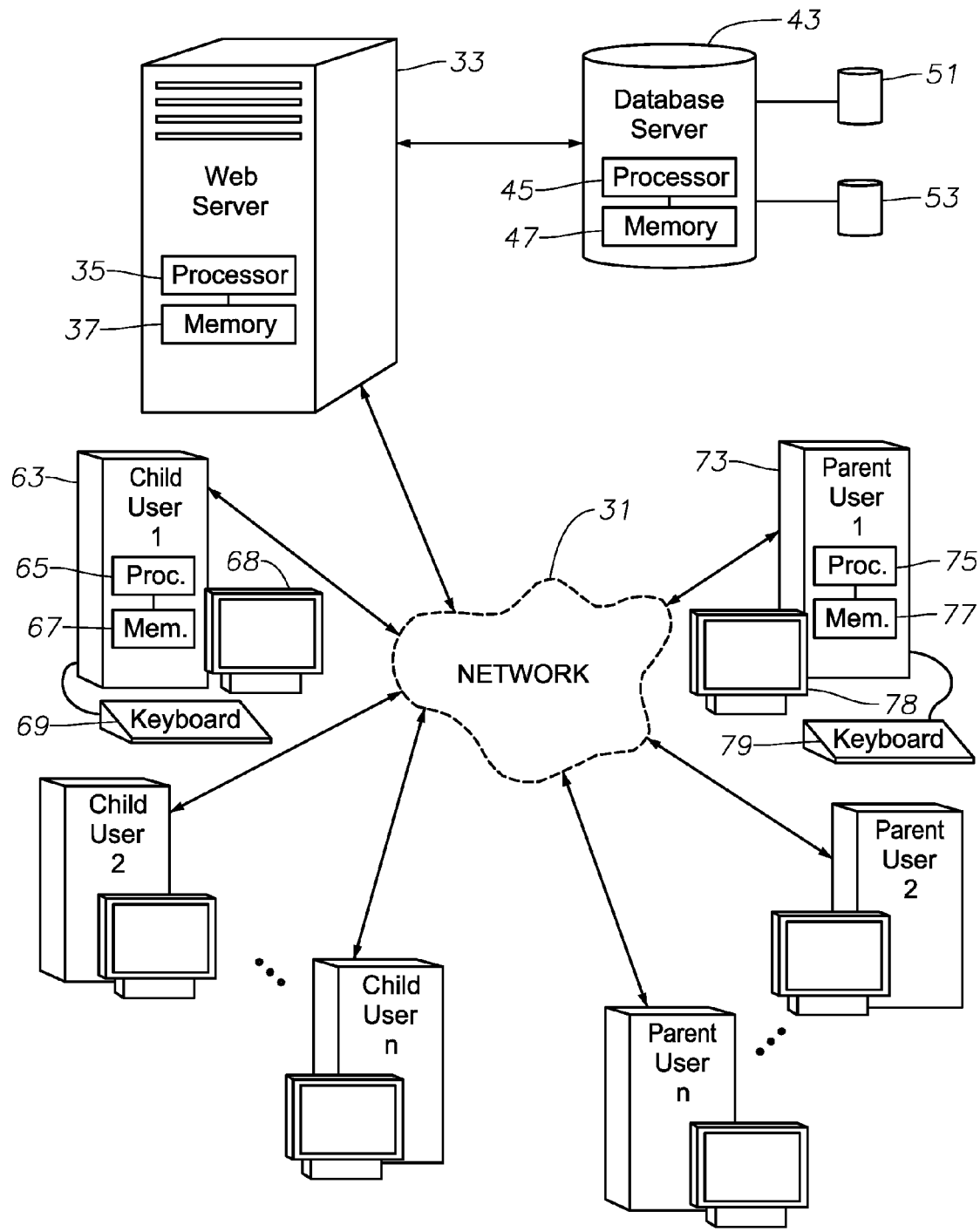
FIG. 1 is a schematic block diagram of a system for managing activities of the child over a communication network according to an embodiment of the present invention.
Figure 2:
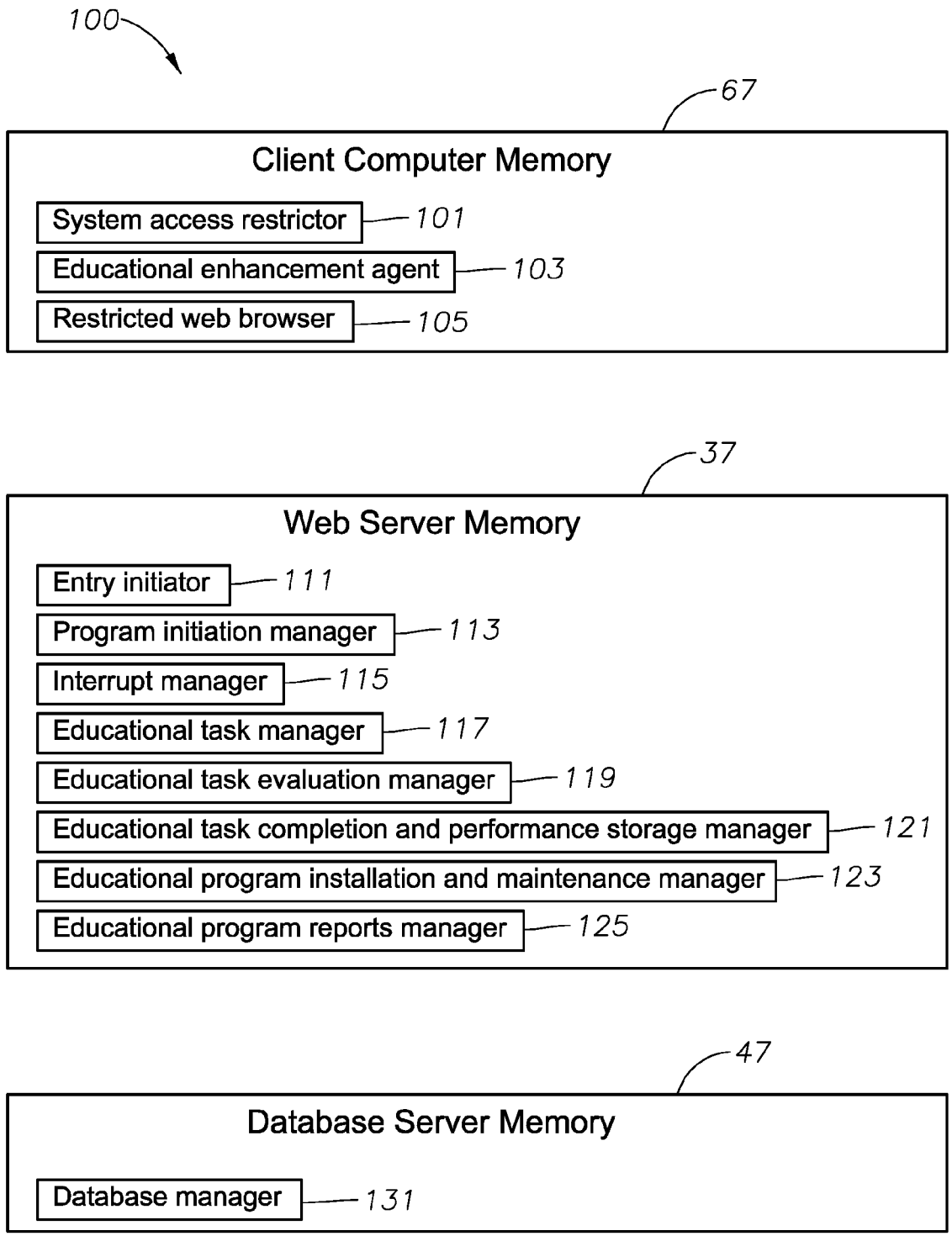
FIG. 2 is a schematic block diagram of an educational enhancement program product according to an embodiment of the present invention.
Figure 3:
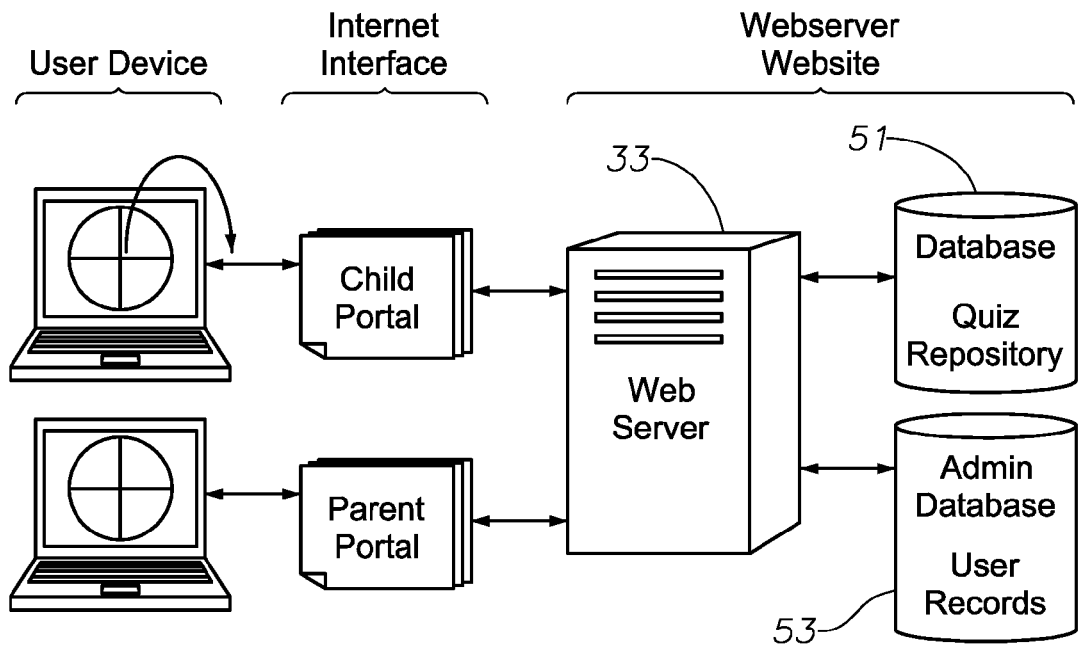
FIG. 3 is a schematic block diagram of portion of a system for managing activities of the child over a communication network according to an embodiment of the present invention.

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art.

As shown in FIGS. 1-20, embodiments of the present invention can advantageously provide a web ("Internet") based system which provides a service to parents to control the activities of their children while on the Internet or other communication network, such as, for example, providing an ability to limit the time spent playing web-based games, and to enrich time spent on the Internet by providing alternative activities and forms of interactive content including educational games, artistic and academic projects, as well as free-form creative tasks. According to an embodiment of the present invention, the child is provided access to whatever content he/she wishes for a given period of time, within the prescribed boundaries of allowable content determined by the parent. At the end of the period, another limited set of site options becomes available, also determined by the parent, for example, from a set provided by the system. Advantageously, these can range from strict educational instructional sites, to free-form creative or academic project sites, such as, for example, a site that provides capabilities to compose music or create visual arts, to sites which identify writing projects based on research, such as historical or scientific topics. According to such an embodiment of the present invention, in order to have access to entertainment sites, the child would complete some requirement on the educational instructional/project sites that would be set by the parent and could range from completion of a given project to simply spending a specific time period in that mode.

More specifically, as illustrated in FIGS. 1-6, embodiments of the present invention include a system 30 for managing activities of the child over a communication network. As perhaps best shown in FIG. 1, a system 30 according to an embodiment of the present invention includes a communication network 31, and one or more computers defining an educational enhancement web server 33 having a processor 35, memory 37 coupled to the processor 35 to store software and/or database records therein, and can include one or more computers defining a database server 43 in communication with the educational enhancement web server 33 to provide database management services thereto and having a processor 45 and memory 47 coupled to the processor 45.

Note, the memory 37, 47, can include volatile and nonvolatile memory known to those skilled in the art including, for example, RAM, ROM, and magnetic or optical disks, just to name a few. Note also, it should also be understood that the preferred server configuration is given by way of example in FIG. 1 and that other types of servers or computers configured according to various other methodologies known to those skilled in the art can be used, including but not limited to those shown in FIGS. 3-6. The server 33, 43, shown schematically in, for example, FIG. 1 represents a server or server cluster or server farm and is not limited to any individual physical server. The server site may be deployed as a server farm or server cluster managed by a serving hosting provider. The number of servers and their architecture and configuration may be increased based on usage, demand and capacity requirements for the system 30. Also, although server 33 and server 43 are shown conceptually as separate components, they may be implemented physically within a single housing and may share various hardware and software components.

Figure 4:
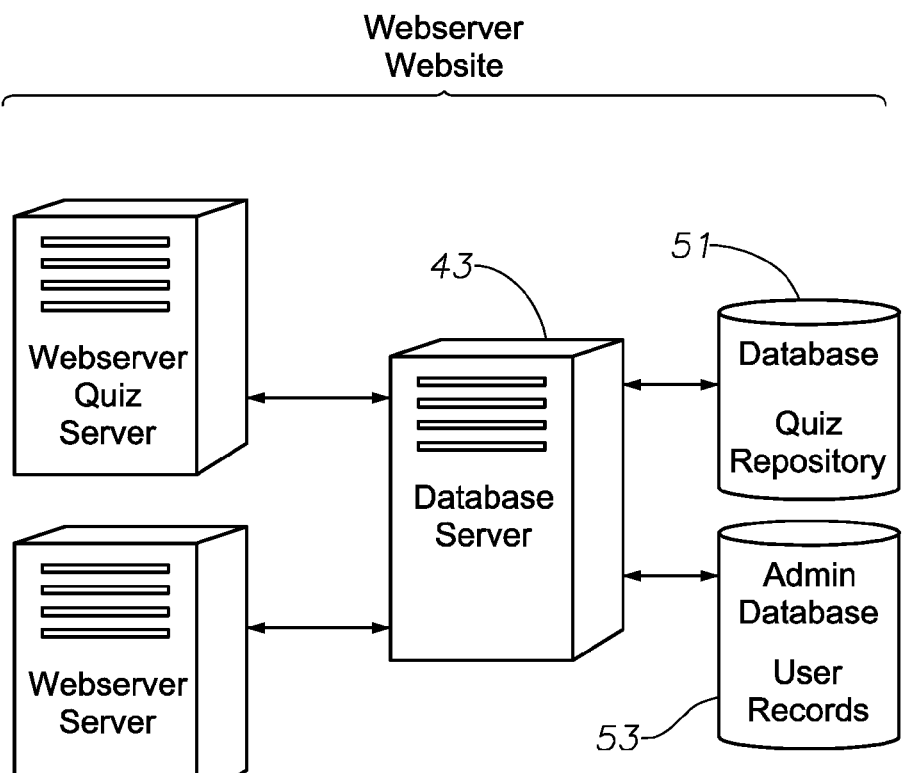
FIG. 4 is a schematic block diagram of portion of a system for managing activities of the child over a communication network according to an embodiment of the present invention.
Figure 5:
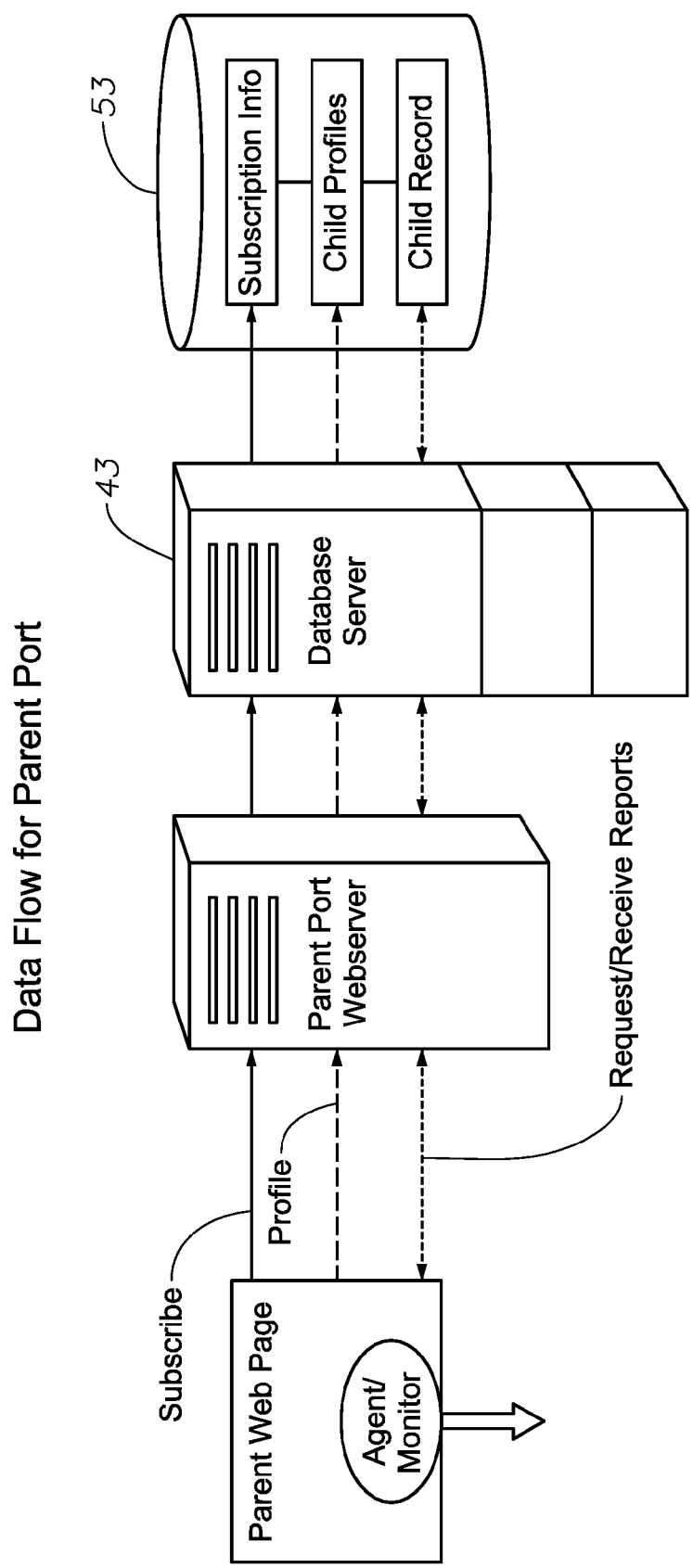
FIG. 5 is a schematic block diagram of dataflow between a parent client user and a database according to an embodiment of the present invention.
Figure 6:
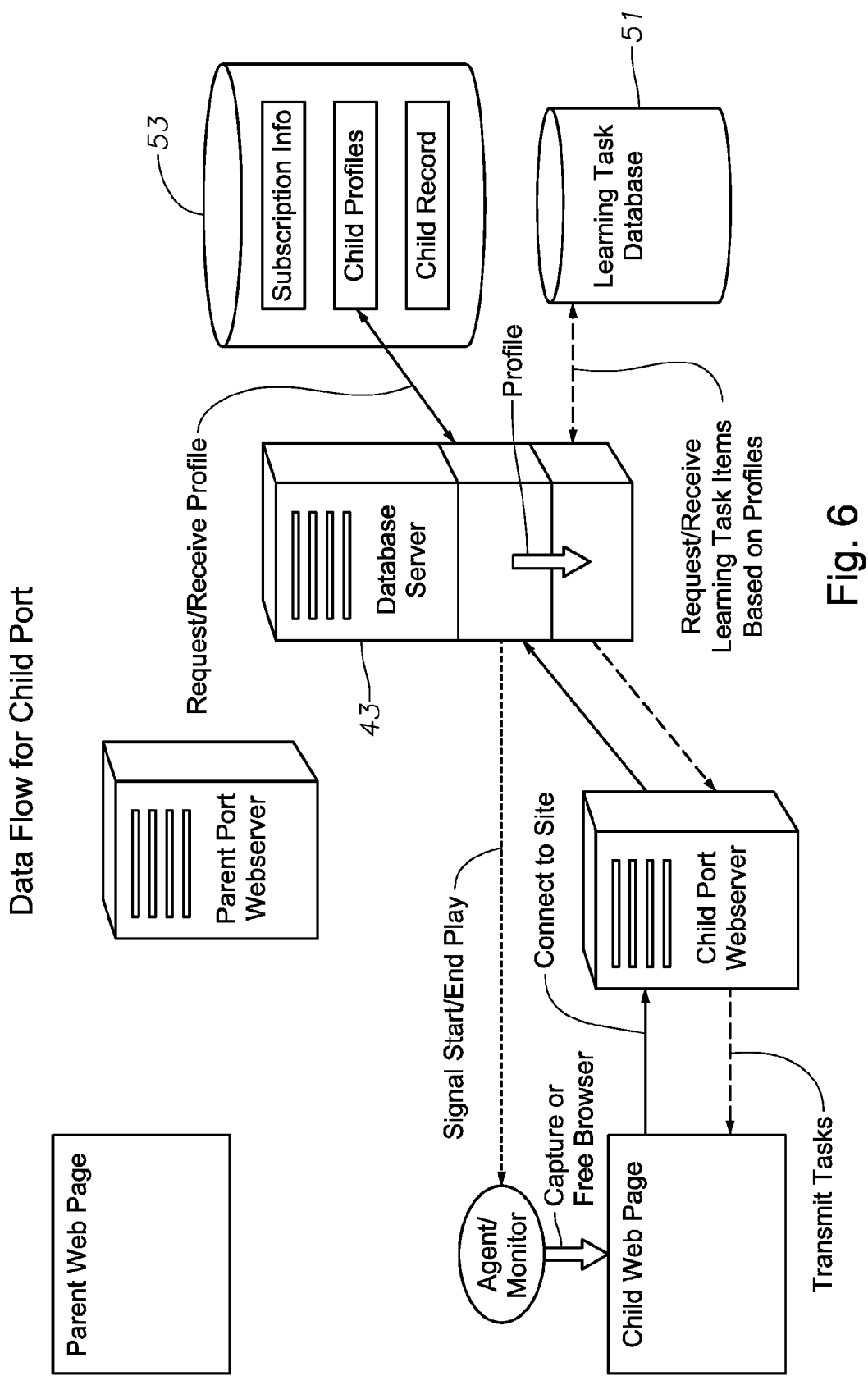
FIG. 6 is a schematic block diagram of dataflow between a child client user and a database according to an embodiment of the present invention.
Figure 7:
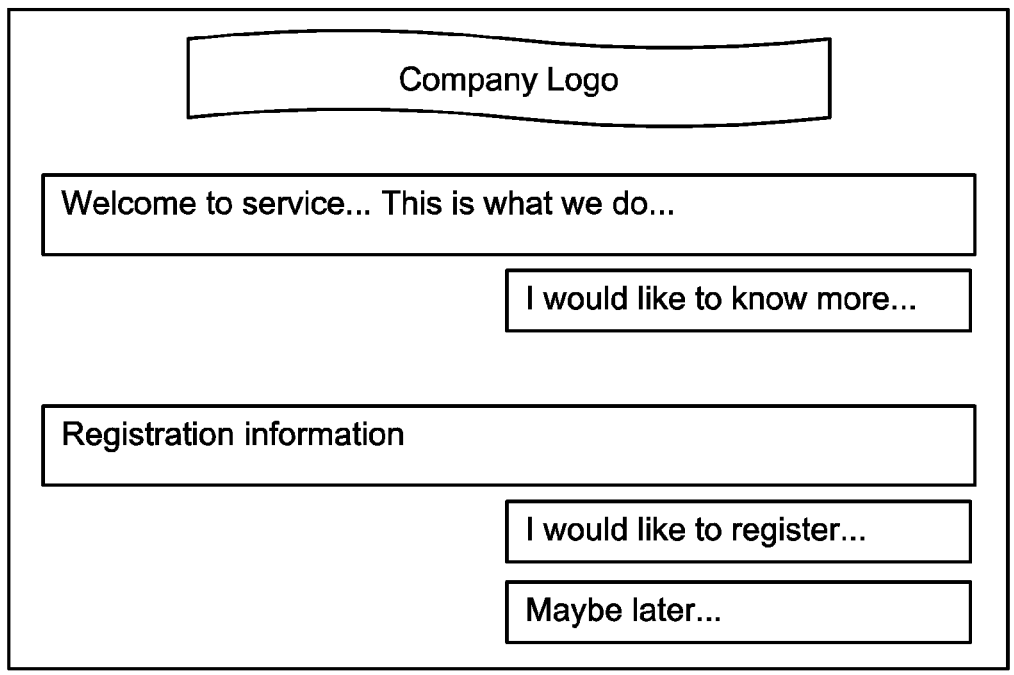
FIGS. 7-8 are schematic block diagrams of a graphical user interface illustrating introductory web pages according to an embodiment of the present invention.
Figure 8:
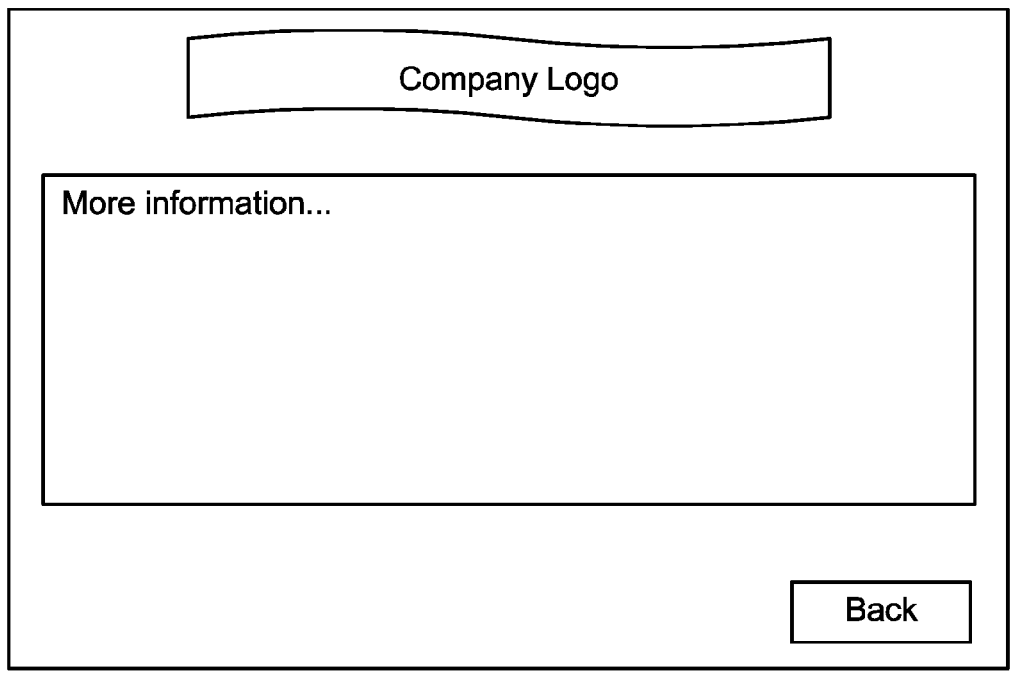

The system 30 can also include at least one, but preferably a plurality of databases, accessible to the educational enhancement web server 33, either directly (see, e.g., FIG. 3), or through the database server 43 (see, e.g. FIG. 4). The databases can include, for example, an educational task (e.g., "quiz") repository database 51 including a plurality of dynamically selectable educational task items organized by grade or age of the child client user, subject matter (e.g., mathematical skill problems, reading comprehension, and other types of academic and practical educational tasks), difficulty, task type (e.g., multiple-choice, fill-on-the-blanks quizzes, essay), and/or performance on prior educational task items (same or different test). Beneficially, the educational task items can be professionally developed and managed by subject matter experts to enhance quality control and improve selection, thus, overcoming some of the inherent difficulties associated with exchanging such data between users.

The databases can also include an administrative (e.g., "user records") database 53 containing a plurality of child client user records associated with a plurality of child client users. The child client user personal records can include identification data, scholastic aptitude data, data identifying a set of a plurality of child client user authorized application programs selected by one or more parent client users and providing a computer-based leisure activity (e.g., to provide a custom desktop or other form of pick list), permissive access criterion (e.g., time allotment, educational task completion requirements (score, time, etc.), present authorization, etc.) associated with each of the plurality of authorized application programs, and child client user task item completion and performance history. Each child client user record can also include an association with one or more parent client users. Note, the records can be structured according to various configurations as known to those skilled in the art. Note also, the term "parent" as used herein also includes guardians, teachers, or other forms of child representative.

The system 30 also includes a plurality of child client user computers 63 each positioned at a respective plurality of child client user sites remote from the educational enhancement web server 33 and accessible to the communication network 31 and having a processor 65 and memory 67 coupled to the processor 65 to store operating instructions therein and to receive data from the educational enhancement web server 33, a display 68 in communication with the processor 65 to display data using, e.g., an associated web browser, and a user interface 69 in communication with the processor 65 to provide the child client user with on-line web-based access to the educational enhancement web server 33 over the communication network 31. The memory 67 of each child client user computer 63 can also include an, e.g., memory resident, educational enhancement agent adapted to receive commands from the educational enhancement web server 33 to interrupt or resume access to an application program adapted to provide a computer-based leisure activity.

The system 30 also includes a plurality of parent client user computers 73 each positioned at a respective plurality of child client user sites remote from the educational enhancement web server 33 and accessible to the communication network 31 and having a processor 75 and memory 77 coupled to the processor 75 to store operating instructions therein and to receive data from and transmit data to the educational enhancement web server 33, a display 78 in communication with the processor 75 to display data using, e.g., an associated web browser, and a user interface 79 in communication with the processor 75 to provide the parent client user with on-line web-based access to the educational enhancement web server 33 over the communication network 31.

The system 30 can also include educational enhancement program product 100 stored in the memory 37 of the educational enhancement web server 33 to facilitate managing activities of a child over the communication network 31. The educational enhancement program product 100 can be in the form of microcode, programs, routines, and symbolic languages that provide a specific set or sets of ordered operations that control the functioning of the hardware and direct its operation, as known and understood by those skilled in the art. The educational enhancement program product 100, according to an embodiment of the present invention, need not reside in its entirety in volatile memory, but can be selectively loaded, as necessary, according to various methodologies as known and understood by those skilled in the art. The educational enhancement program product 100 can include program modules or other functional implementations known to those skilled in the art to direct the agent (described later) on the child client user computer 63 to interrupt or resume the child's play; that present web pages custom-configured to the particular child that welcome and orient the child and instruct the child on carrying out the educational tasks (see, e.g., FIGS. 11-15); that present collections of dynamically selected educational task items based on the child's personal profile, for example, as submitted by the parent and the child's history of completion of previous educational tasks; that evaluate the child's performance on the educational tasks and calculate the rewarded time for the child's subsequent play interval (see, e.g., FIGS. 16-19); and that collect and store the child's grades on educational tasks (see, e.g., FIGS. 19-20). The educational enhancement program product 100 can also include one or more program modules or other functionality that manage interactions with the parent subscriber (see, e.g., FIG. 20), the functions of which can include: answering inquiries about the activity management services, subscribing the parent and children, installing the agent program, collecting and storing data regarding the parent's choices for customizing the educational tasks and performance based reward schedules to direct to the agent program, providing online reporting of child's performance, providing online reporting of child's real-time activity such as educational task completion and sites currently visited, providing a history online or via email of the child's performance on educational tasks, providing information regarding performance in comparison to statistics from sets of the other children, and providing a history of the child's computer leisure activity such as time spent and sites visited.

Embodiments of the educational enhancement program product 100 include various high-level functional modules, portions of which reside in the memory 67 of the child client user computer 63, the memory 37 of the educational enhancement web server 33, and/or the memory 47 of the database server 43, if implemented as a separate physical structure. For example, as perhaps best shown in FIG. 2, according to an embodiment of the present invention, the educational enhancement program product 100 can include a system access restrictor 101 adapted to restrict access to one or more computer-based leisure activity application programs responsive to child client user identification data, for example, by restricting access to the computer's file system, and operating system utility and admin programs/tools; an educational enhancement agent 103 adapted to receive commands from an educational enhancement web server 33 and to interrupt or resume the one or more computer-based leisure activity application programs; and a restricted web browser adapted to limit navigational functionality to a set of predetermined websites and in the form of either self contained program or one made restricted via a browser extension or add-on.

Figure 11:
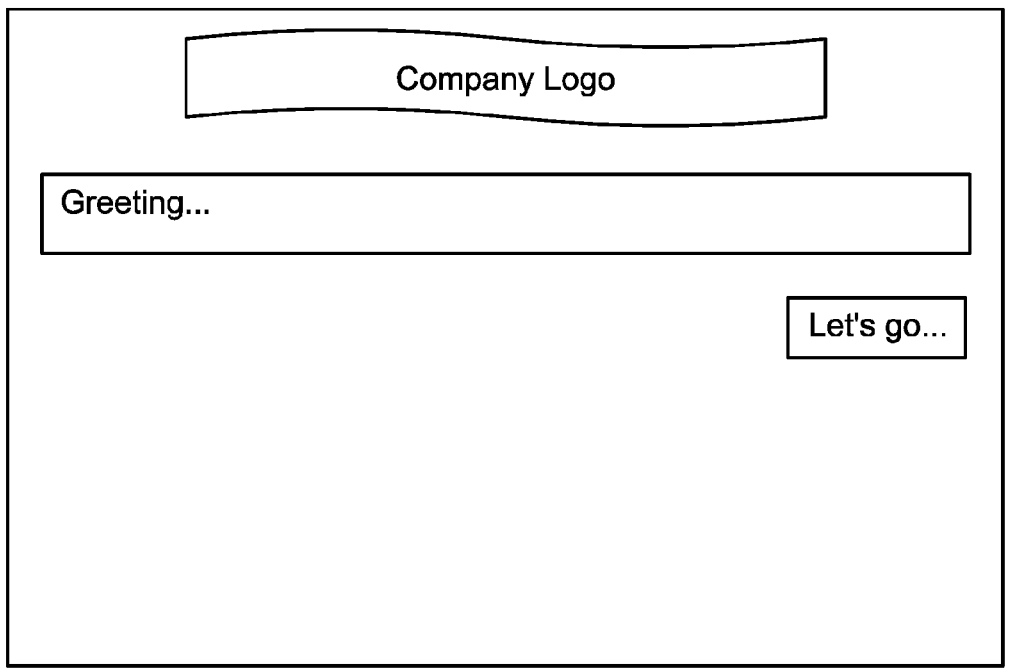
FIGS. 11-12 are schematic block diagrams of a graphical user interface illustrating introductory web pages according to an embodiment of the present invention.
Figure 12:
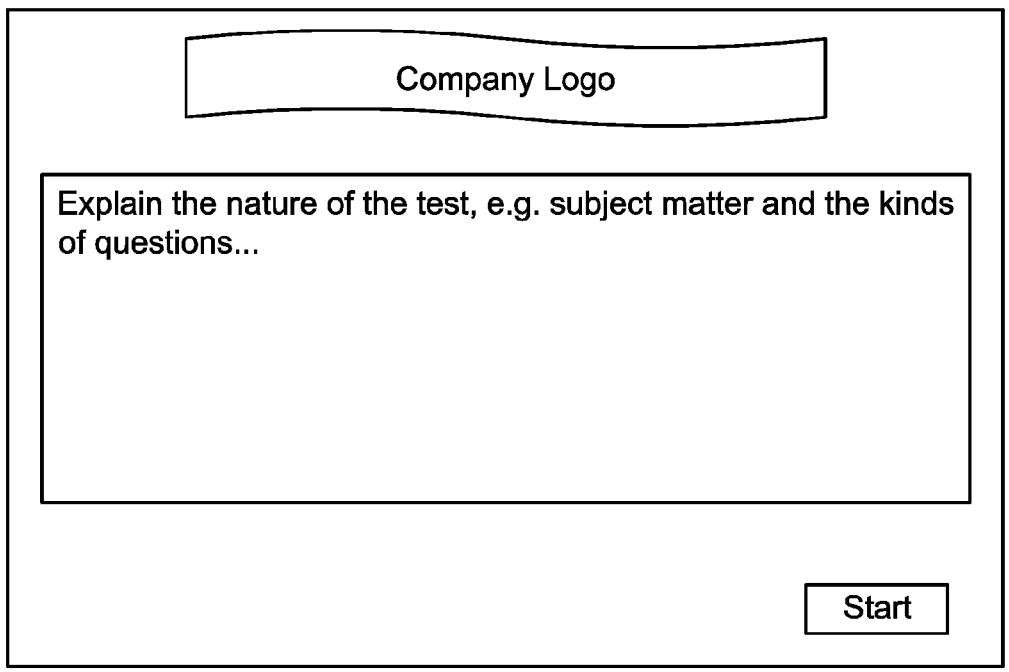
Figure 15:
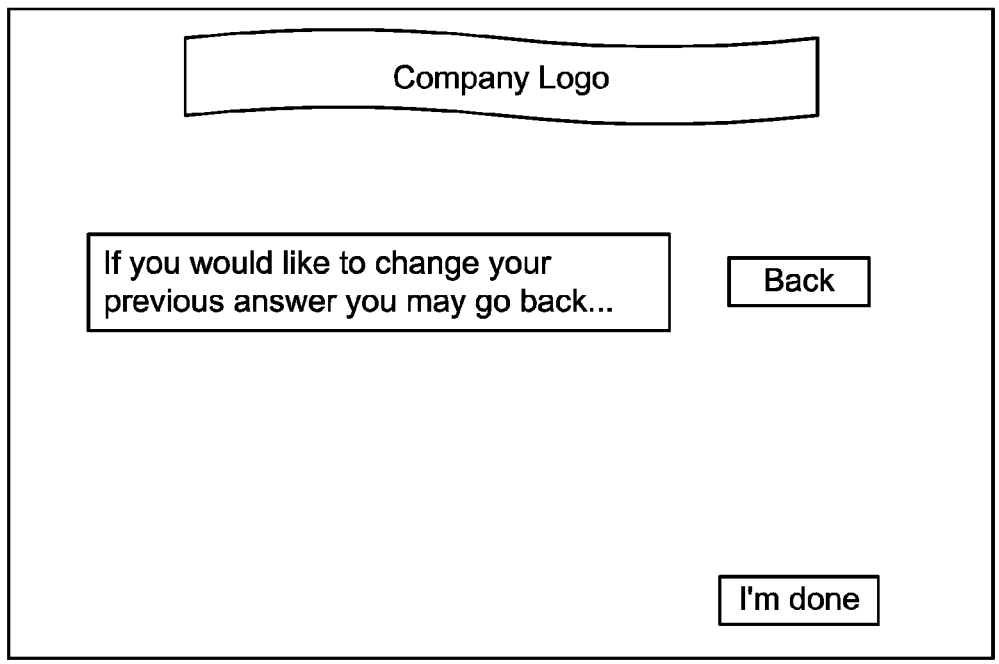
Figure 16:
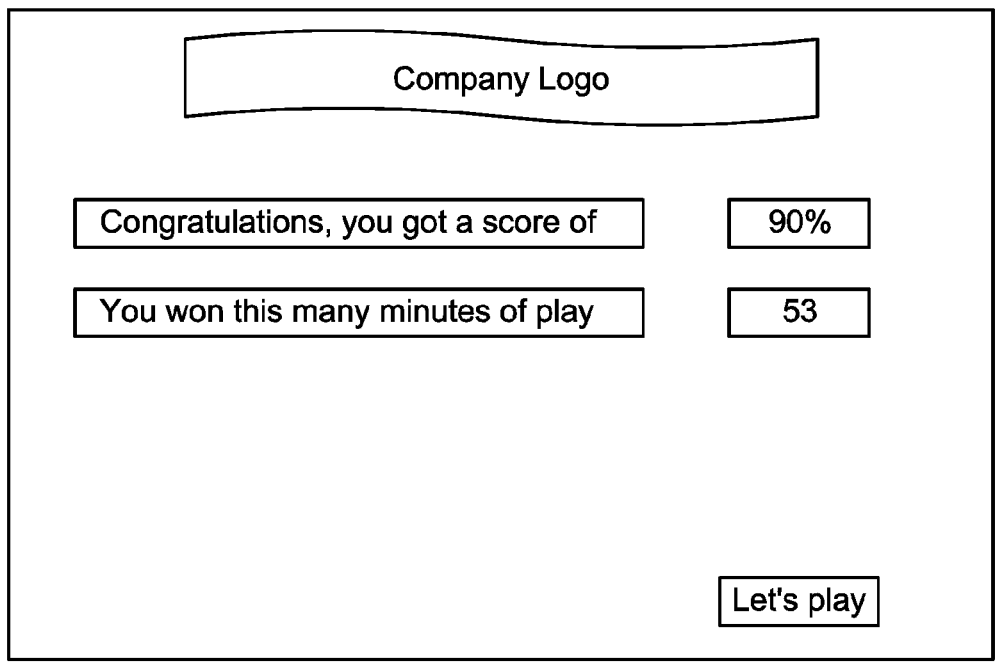
FIGS. 16-17 are schematic block diagrams of a graphical user interface illustrating educational task evaluation results web pages according to an embodiment of the present invention.

The educational enhancement program product 100 can also include an entry initiator 111 adapted to access the child client user records in the database 51, 53, to thereby provide user login access for, and authentication of, each child client user and to provide user login access for, and authentication of, an associated parent client user to allow entry of and access to data stored in the child client user records; and a program initiation manager 113 adapted to present custom-configured webpages to a respective child client user to thereby welcome and orient the child client user and to instruct the child client user on how to execute the one or more required educational tasks (see also, FIGS. 11-12). The educational enhancement program product 100 can also include an interrupt manager 115 adapted to access interrupt criteria for the child client user (e.g., global or specific to one or more preselected application programs) to continuously determine at least one of the following: cumulative expended leisure usage time or cumulative computer-based leisure activity application program run time (time prior to a last interrupt) to initiate commands to the educational enhancement agent to interrupt the one or more application programs responsive to the interrupt criteria, and to initiate commands to the educational enhancement agent residing on the child client user computer 63 to resume the one or more application programs responsive to satisfaction of associated resumption criteria.

The educational enhancement program product 100 can also include an educational task manager 117 adapted to dynamically select a plurality of educational task items for assignment to the client child user responsive to/based on the client child user's personal profile data submitted by the associated parent client user and/or task item completion and performance history data for the child client user, and responsive to the interrupt manager 115; and an educational task evaluation manager 119 adapted to receive educational task completion data to evaluate educational task performance of the child client user for each assigned educational task, and to determine if the respective child client user satisfied associated resumption criteria to thereby determine an amount of resumption time for additional computer-based leisure activity prior to a next interrupt. The educational enhancement program product 100 can also include an educational task completion and performance storage manager 121 adapted to receive evaluation data from the educational task evaluation manager 119 to thereby manage storing the child client user task item completion history and performance history in a website repository of educational task items (e.g., database 51).

The educational enhancement program product 100 can also include an educational program installation and maintenance manager 123 adapted to provide answers to inquiries about the web-based educational enhancement program, to subscribe the parent client user and associated child client user, to manage installation of the educational enhancement agent, and to collect and store selection data providing customized educational tasks and performance based reward schedules selected by the parent client user for each separate associated child client user (see also, FIGS. 7-10). The educational enhancement program product 100 can also include an educational program reports manager 125 adapted to provide online (e.g., by messenger or e-mail) reporting of real-time child client user activity status of an associated child client user (e.g., educational task completion, application programs/web sites currently visited, etc.) to a parent client user for an associated child client user; realtime child client user performance data on newly completed educational tasks; child client user task item completion and performance history; child client user performance comparative statistics; and child client user computer-based leisure activity history (e.g., time spent, sites visited, application programs used, etc.), responsive to a real-time child client user milestone, on-demand request, or preselected periodic interval.

The educational enhancement program product 100 can also include a database manager 131 adapted to manage an educational task database (e.g., database 51) and a subscriber database (e.g., database 53), to integrate data between the educational task database and the subscriber database, and to pass data between the databases and the educational enhancement web server 33.

According to another embodiment of the present invention, at least portions of the educational enhancement program product 100 stored in the memory 37 of the educational enhancement web server 33 include instructions that when executed by a processor, e.g., processor 35 of the educational enhancement web server 33, cause the educational enhancement web server 33 to perform the operations of receiving computer-based leisure activity time limit criteria data defining permissive access data from an associated parent client user for the child client user (see, e.g., FIG. 10), optionally receiving identification of at least one authorized application program (e.g., local or web-based game) during initial installation configuration and periodically thereafter to provide the respective child client user a computer-based leisure activity, and associating the permissive access data with a child client user profile record for the child client user. The permissive access criteria can include one or more of the following: a parent client user selected minimum passing score for test-based educational task items and a parent client user selected educational web site minimum access/view/work time.

The operations can also include receiving data from a child client user computer 63 identifying a child client user, dynamically selecting educational task items from the at least one database 51 responsive to data stored in the child client user profile record for the respective child client user, providing data to the child client user computer 63 to display a first educational task required to be completed to allow access to at least one application program configured to provide the respective child client user a computer-based leisure activity (see, e.g. FIGS. 13-15) if a previous access time limit computation is not still running, and providing data to direct the educational enhancement agent 103 to allow access to the at least one application program responsive to child client user satisfaction of access criteria (e.g., completion of a required educational task for a preselected time, obtaining a minimum preselected score, or the existence of a time award based on a previous satisfaction of access criteria). Various methodologies of displaying the application program can include, for example, the child client user computer displaying a desktop, a web page window, or web page toolbar listing each child client user application program selectable to launch the respective application program responsive to the respective child client user computer receiving access data.

According to an embodiment of the present invention, in order to satisfy access criteria, the educational enhancement agent 103 either provides data to direct the child client user computer 63 to receive and display an educational site webpage presenting a set of dynamically selected educational task items (event-based reward configuration) responsive to receiving the interrupt order (see, e.g., FIGS. 13-14), and/or provides data to direct the child client user computer 63 to receive and display an educational site webpage or webpage toolbar listing at least one available educational sites which must be accessed/viewed, for example, for a preselected amount of time (view time based reward configuration) responsive to receiving an interrupt order from the educational enhancement web server 33.

Note, according to an implementation where the interrupt order is instead directed to interrupt a specific application program or programs selected by a parent client user to provide the respective child client user the computer-based leisure activity, rather than a global interruption or resumption, the operation of providing data to direct the educational enhancement agent 103 to allow access to the at least one application program can include the operation of providing the child client user computer permissive access data including the identification of the affected application program to thereby allow child client user selection of the application program. Note also, various other implementations as would be understood by those skilled in the art, are within the scope of the present invention.

According to an embodiment of the present invention, the educational enhancement agent 103, downloaded as part of an installation process, provides the ability to pre-empt navigational control and direct a browser to the educational enhancement website. According to one implementation of this functionality or lack of functionality, a special program is provided that encapsulates a limited function browser (e.g., restricted web browser 105). A beneficial functionality limitation would be the lack or absence of general navigation capabilities of a general purpose browser such as forward and back buttons, or links held in such facilities of the general purpose browser such as the history list or the address box, etc. Navigation with this limited functionality browser would be restricted to links that are internal to the program and to those that are provided by the website. According to an embodiment of the present invention, on activation of this restricted browser, the system would capture focus from the running program or general purpose browser and not relinquish it until the educational task is completed successfully. To enable control over the other avenues of navigation, such as links embedded in files or other applications, one implementation is to create a controlled implementation of the application space, e.g., the desktop, such that no access to the file system is available and only programs selected by the parent during configuration are available. When the child client user computer 63 recognizes the child's login, it would launch this restricted space. Another implementation for directing a browser to the educational enhancement website is to launch a new instance of the general purpose web browser directed to the educational enhancement website and overriding its navigation facilities to land only on the educational enhancement website. Note also, various other implementations as would be understood by those skilled in the art, are within the scope of the present invention.

Having either previously or currently satisfied the necessary access criteria and having previously or currently calculated an amount awarded permissive access (leisure usage) time, the operations can also include either monitoring expended permissive access (leisure usage) time to thereby determine when to provide the data to direct the educational enhancement agent 103 to interrupt the computer-based leisure activity, or monitoring usage time of each of the at least one application programs, depending upon how accrued time usage calculations are implemented, to thereby determine when to provide the data to direct the educational enhancement agent 103 to interrupt the computer-based leisure activity; and correspondingly further includes providing data to direct the educational enhancement agent 103 to interrupt the computer-based leisure activity (e.g., provide an interrupt order) responsive to reaching an associated permissive access time limit.

According to an embodiment of the present invention, rather than immediately interrupt the leisure activity, the educational enhancement agent 103 can provide data to initiate display of a warning to the child client user that the computer-based leisure activity is about to be interrupted to thereby allow the child to save associated application program data (game state) responsive to receiving the interrupt order. Regardless, once permissive access time and/or any grace period has been expended, according to an embodiment of the present invention, the educational enhancement agent 103 either provides data to direct the child client user computer 63 to receive and display an educational site webpage presenting a set of dynamically selected educational task items (event-based) responsive to receiving the interrupt order, or provides data to direct the child client user computer 33 to receive and display an educational site webpage or webpage toolbar listing at least one available educational site (time based), responsive to receiving the interrupt order from the educational enhancement web server 33.

The operations can also include dynamically selecting educational task items from the, e.g., database 51, responsive to the preselected permissive access time limit, responsive to data stored in the child client user record for the respective child client user, and responsive to performance on prior educational task items; and providing data to the child client user computer 63 to display a second educational task required to be completed to allow access of the interrupted computer-based leisure activity. The operations can further include receiving educational task completion data for the educational task provided to the child client user, and evaluating educational task performance of the child client user responsive to completion of the educational task to determine if the respective child client user satisfied associated access criteria to thereby determine an amount of access time for additional computer-based leisure activities prior to a next interrupt. The operations can additionally include notifying the child client user of the outcome (see FIGS. 16-17), providing data to direct the educational enhancement agent 103 to resume the computer-based leisure activity responsive to child client user satisfaction of access criteria (e.g., completion of a required educational task for a preselected time or obtaining a minimum preselected score), and storing completion and performance data associated with the educational task, for example, in the user record database 53. The operations can also include optionally providing real-time notification of the completion and the performance of the educational task to an associated parent client user, e.g., via e-mail or instant messenger, etc., along with child client user current status. The operations can further include providing a message link between a parent client user computer 73 and an associated child client user computer 63 when logged into the educational enhancement web server 33, to allow direct communication therebetween.

In order to generate more detailed reports, the operations can still further include monitoring usage time of each application program, and/or non-educational and educational site accessed/viewed. Such operation or operations can include monitoring cumulative usage time of each active usage of each different application program, and of each instance of the same application program. The operations can also include storing cumulative child client user access time individually for each application programs and cumulative child client user access time for each website accessed by the respective child client user for at least one time period, and providing parent client user access to child client user current status, and access to current and historic completion and performance data for an associated child client user.

According to an embodiment of the present invention, the operations can also include unique update functionality, such as, for example, receiving subsequent real-time permissive access data updates from the associated parent client user for the child client user, and providing real-time permissive access update data to the educational enhancement agent 103. The educational enhancement agent 103 can provide the updated permissive access (real-time) responsive to the permissive access update data. This "updated permissive access," however, may include termination of access to the leisure activity depending upon the state of change embodied in the updated permissive access.

Beneficially, according to an embodiment of the present invention, various Internet technologies are incorporated, for example, to provide enhanced dynamic selection and real-time permissive access criteria updates. According to an embodiment of the present invention, the system 30 incorporates Internet technologies such as those under the rubric of "AJAX" which permit the updating of a part of a webpage via local script with information sent by the web site asynchronously, that is, without the user having to go through the canonical request-response cycle that results in the transmission of an entire page for each change in a web page. Such technology enhances dynamic (real-time) selection of educational task items so that, for example, entirely new items can be added to the educational task repository and made available immediately for an ongoing educational task exercise, even while the child is doing that exercise. System 30 can also or alternatively incorporate use of self-contained web graphic presentation programs such as Adobe (Macromedia) Flash and/or others to enhance the presentation of the educational tasks.

Beneficially, the above described dynamic selection and presentation via the Internet can also permit greater flexibility in the groupings of educational task items tailored to the particular profile of the child performing the task. Such flexibility extends to providing follow-up items (e.g., quiz questions) in real-time, depending on the performance on previous items (i.e., answered correctly or answered incorrectly). Finally, the accumulation and analysis extensive data on a large population, e.g., in database 53, can provide a base of knowledge for improving both the educational effectiveness of the educational tasks and their presentation, not to mention a data mine amicable to statistical analysis.

Embodiments of the present invention include methods for managing activities of a child over a communication network. For example, a method according to an embodiment of the present invention, as perhaps best illustrated in FIGS. 19-20, includes the steps of receiving data through a communication network 31 from a child client user computer 63 identifying a respective child client user (e.g., referencing user records in database 53), dynamically selecting educational task items forming an educational task from at least one database (e.g., database 51), for example, responsive to a permissive access time limit, responsive to data stored in a child client user record for the respective child client user, and/or responsive to performance on prior educational task items, and providing data through the communication network 31 to the child client user computer 63 for the child client user computer 63 to display the educational task (see, e.g., FIGS. 13-14), required to be completed to allow access to at least one application program configured to provide the child client user a computer-based leisure activity. The criteria for dynamically selecting the educational task items can include child client user personal profile data submitted by an associated parent client user and child client user task item completion and performance history for the respective child client user.

Note, in this exemplary embodiment of the present invention, an educational enhancement agent 103 residing in the memory 67 of the child client user computer 63 provides data to direct the child client user computer 63 to receive and display one or more of the following: an educational site webpage presenting the set of dynamically selected educational task items, and/or an educational site webpage or webpage toolbar listing at least one available educational sites, responsive to receiving the interrupt order. Note also, according to an embodiment of the method, any educational task items added to the database 51 after an educational task has been provided to the child client user computer 63 are made available for dynamic selection during the ongoing educational task being performed by the child client user.

Figure 17:
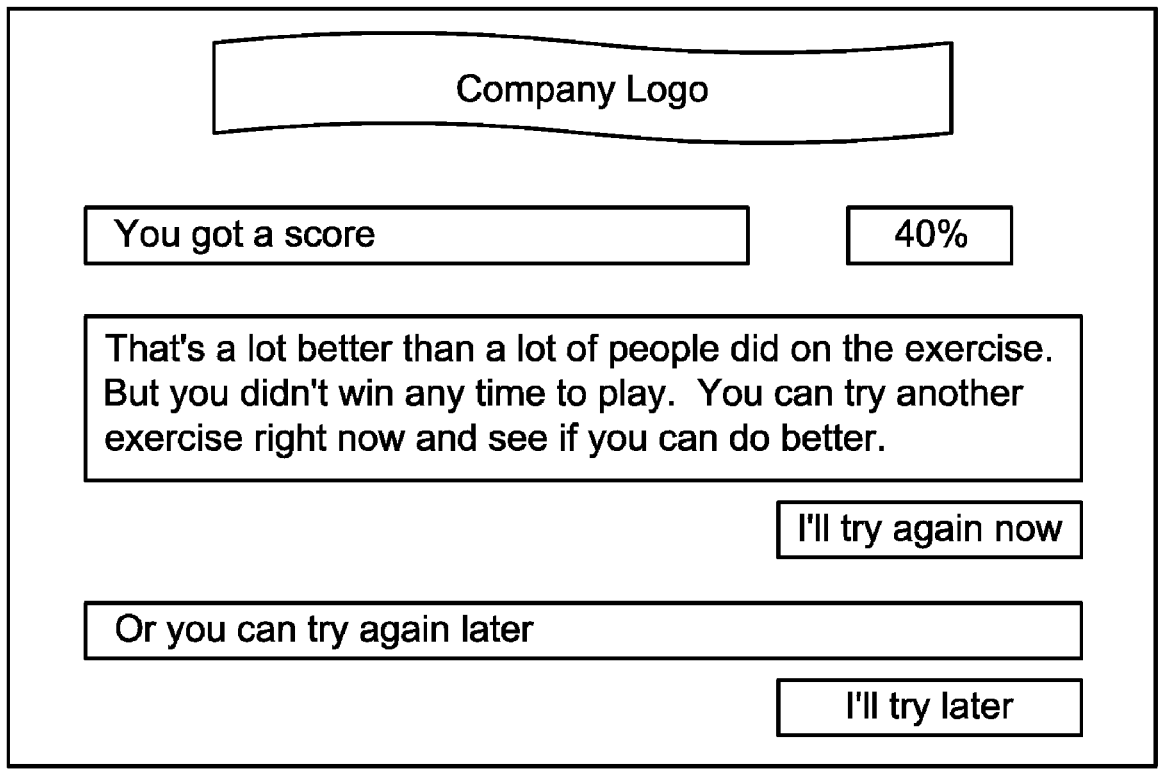
Figure 18:
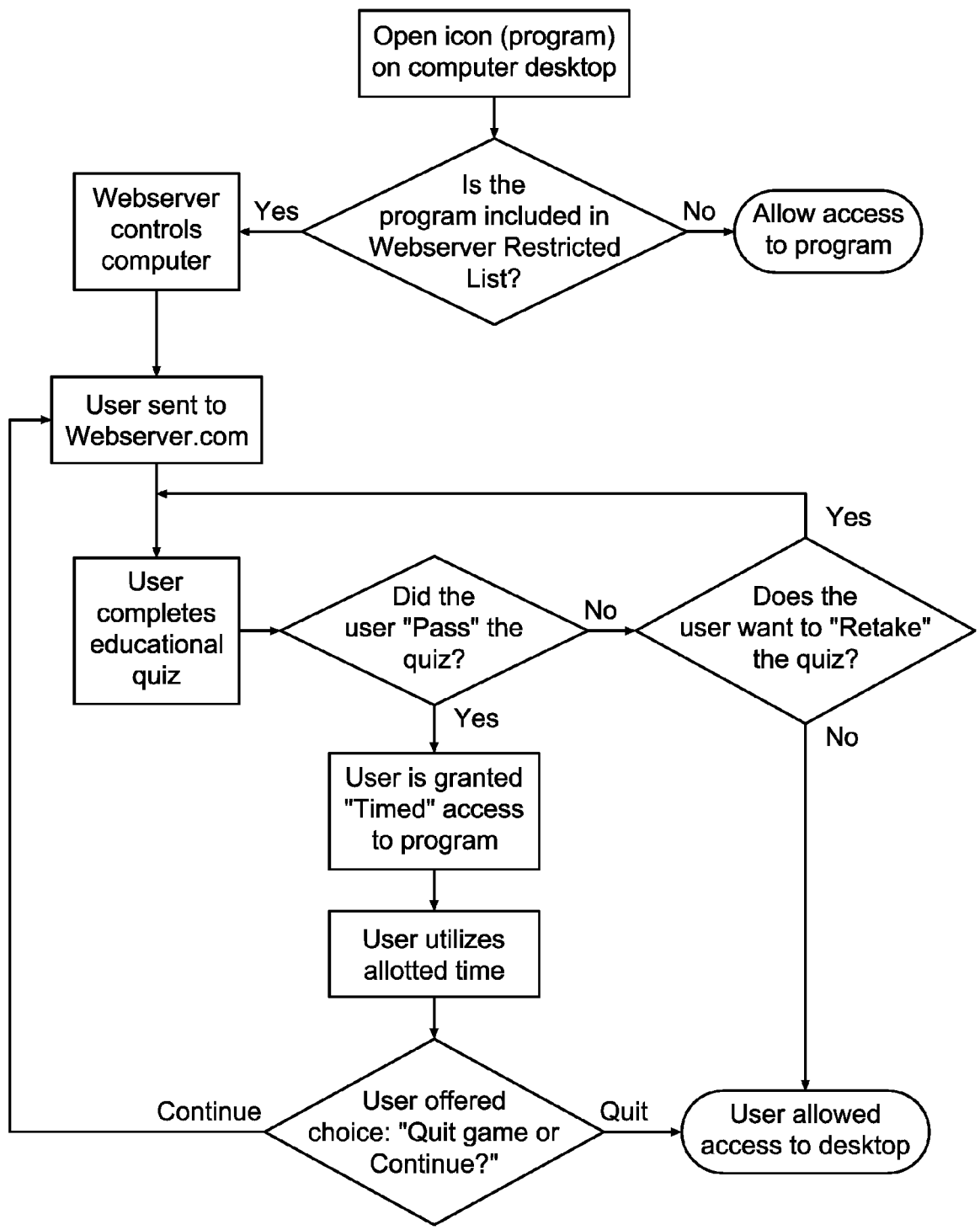
FIG. 18 is a schematic block diagram illustrating a high-level flow diagram of a method of managing activities of the child over a communication network according to an embodiment of the present invention.
Figure 19:
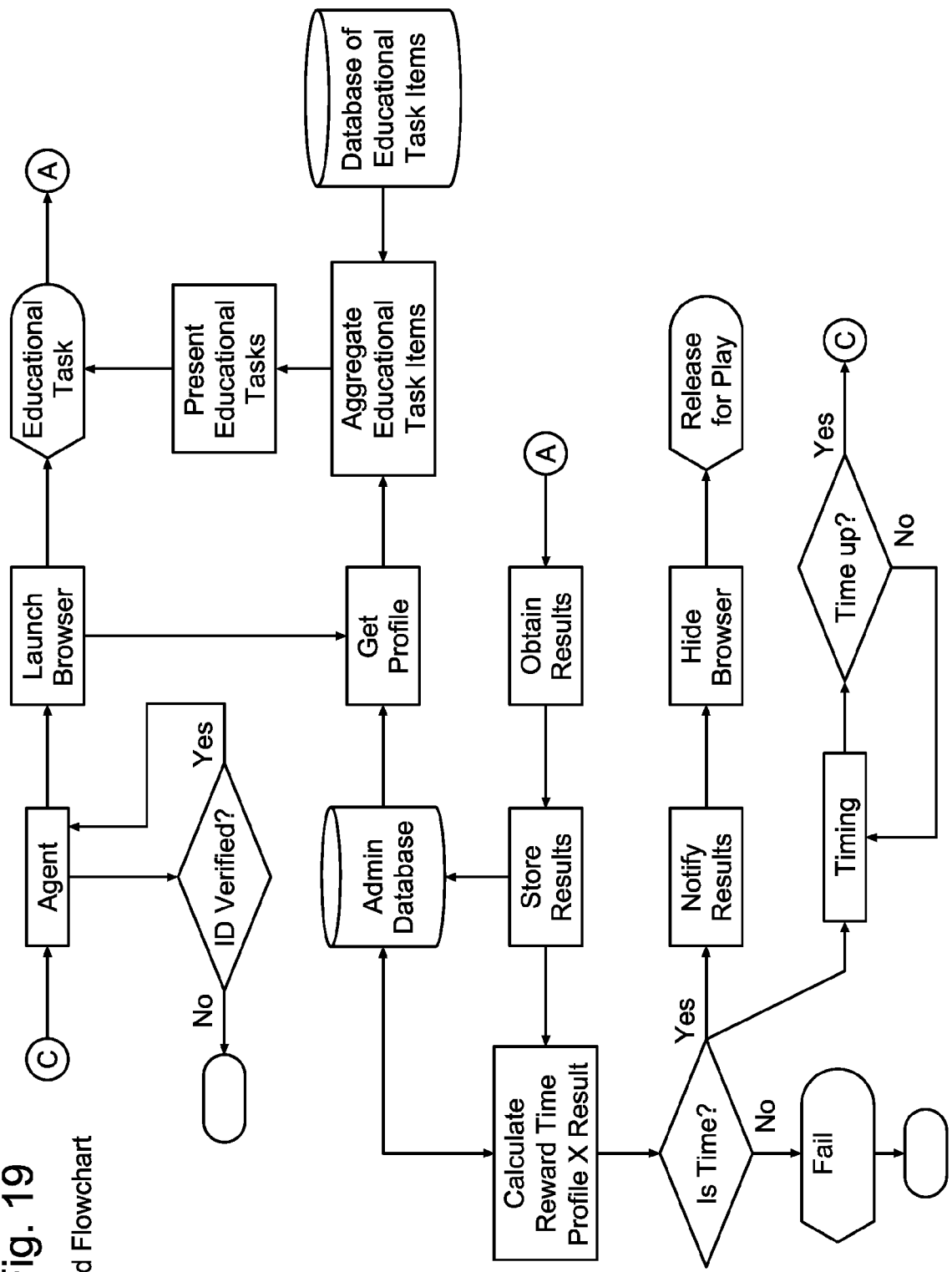
FIG. 19 is a schematic block diagram illustrating a high-level flow diagram of a method of managing activities of the child over a communication network according to an embodiment of the present invention.
Figure 20:
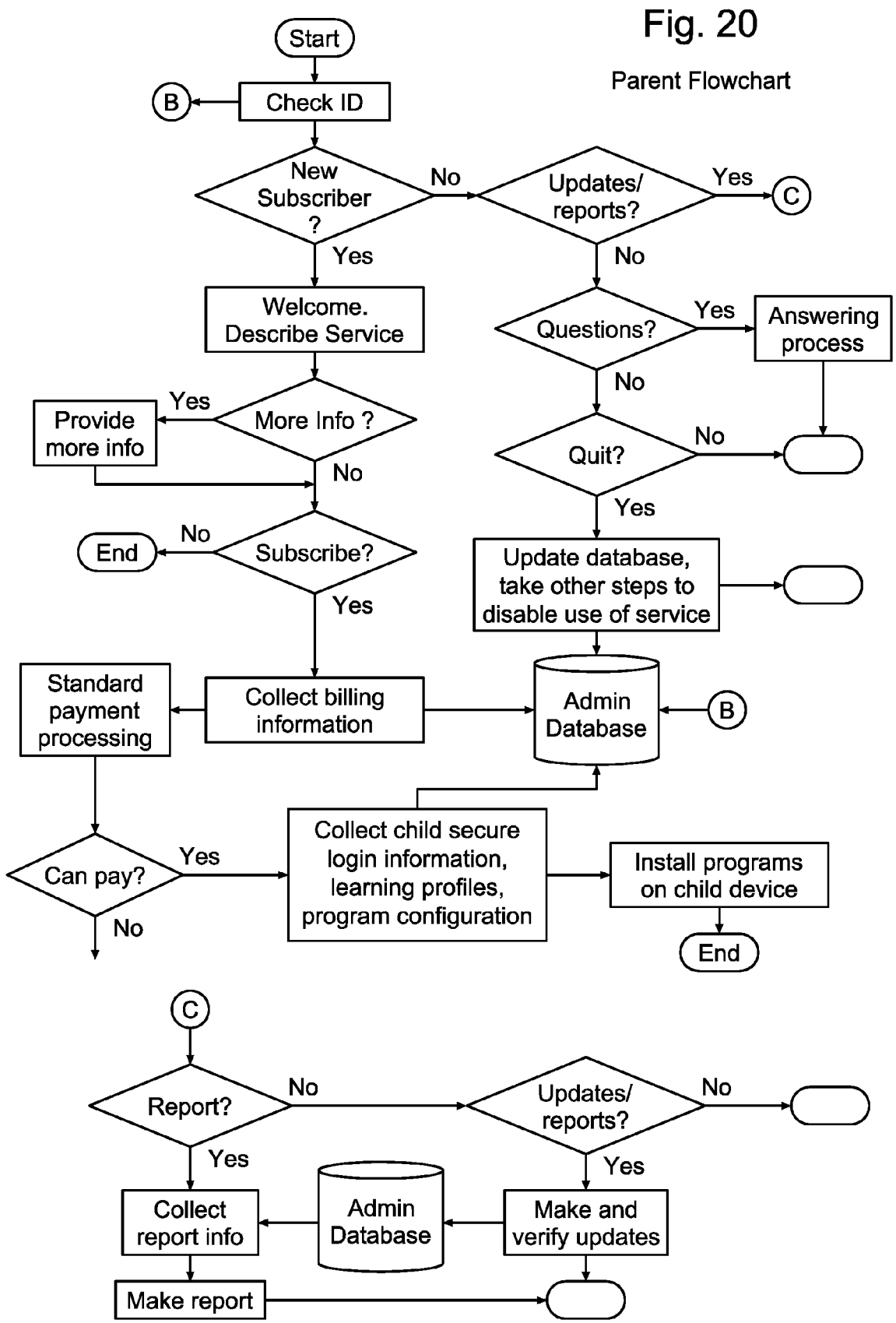
FIG. 20 is a schematic block diagram illustrating a high-level flow diagram of a method of managing activities of the child over a communication network according to an embodiment of the present invention.

The method can also include the steps of receiving educational task completion data for each respective one of the educational tasks provided to the child client user, evaluating educational task performance of the child client user responsive to completion of the respective educational task to determine if the child client user satisfied associated access criteria to thereby determine an amount of permissive access time for computer-based leisure activities prior to a next interrupt, and responsive to child client user satisfaction of access criteria, providing data through the communication network 31 to direct the educational enhancement agent to allow access to the various leisure-providing application programs (configured to provide a computer-based leisure activity), along with data to display notification thereof (see, e.g., FIG. 16), or if the access criteria was not met, providing data to display a notification thereof (see, e.g., FIG. 17).

The access criteria can include, for example, the child client user performing the educational task for a preselected time, obtaining at least a minimum passing score, or otherwise meeting some either fixed or floating performance objectives. According to an embodiment of the method, the step of providing data to direct the educational enhancement agent to allow access can include the step of providing permissive access data to the child client user computer containing identification of at least one leisure-providing application program to thereby allow child client user selection of the application program. As such, the leisure-providing application program or programs can be selected by a parent client user.

The method can also include the steps of remotely monitoring expended permissive access time to thereby determine when to provide the data to direct the educational enhancement agent to interrupt the computer-based leisure activity, providing data through the communication network 31 to the child client user computer 63 to direct the educational enhancement agent to interrupt the computer-based leisure activity responsive to a permissive access time limit, dynamically selecting educational task items forming an educational task from at least one database (e.g., database 51), providing data through the communication network 31 to the child client user computer 63 to display an educational task required to be completed to allow resumption of the interrupted computer-based leisure activity, receiving educational task completion data for the educational tasks provided to the child client user, evaluating educational task performance of the child client user responsive to completion of the respective educational task to determine if the child client user satisfied associated access criteria to thereby determine an amount of permissive access time for computer-based leisure activities prior to a next interrupt, and responsive to child client user satisfaction of the access (resumption) criteria, providing data through the communication network 31 to direct the educational enhancement agent to resume the computer-based leisure activity, along with data to display notification thereof (see, e.g., FIG. 16), or if the resumption criteria has not been met, providing data to display a notification that the access criteria was not met (see, e.g., FIG. 17).

As part of an installation process, the method can also include, for example, the steps of receiving computer-based leisure activity time limit criteria data defining permissive access data for the child client user through the communication network 31 from an associated parent client user, and associating the time limit criteria data with a child client user record for the child client user. The permissive access criteria can include one or more of the following: a parent client user selected minimum passing score for test-based educational task items, and a parent client user selected minimum educational web site access/view time. Further, as part of an ongoing update process, the method can also include, for example, the steps of receiving subsequent real-time permissive access data updates from the associated parent client user for the child client user; and providing real-time permissive access update data to the educational enhancement agent.

It is important to note that while embodiments of the present invention have been described in the context of a fully functional system, those skilled in the art will appreciate that the mechanism of at least portions of the present invention and/or aspects thereof are capable of being distributed in the form of a computer readable medium of instructions in a variety of forms for execution on a processor, processors, or the like, and that the present invention applies equally regardless of the particular type of signal bearing media used to actually carry out the distribution. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication links. For example, such media can include at least portions of the educational enhancement program product and computer readable instructions that when executed cause a computer to perform the various method steps, according to embodiments of the present invention, including those described above. Note, computer is broadly defined to include various computing devices capable of providing computer-based leisure activities, such as, for example, desktop personal computers, notebook or laptop computers, dedicated game boxes, personal digital assistants (PDAs), cellular telephones, and other hand held and/or wireless communication devices, being but a few examples.

Beneficially, according to various embodiments of the present invention, the only element of the invention required to be locally resident on, and requiring resources of, a client machine, is the educational enhancement agent. The restricted browser may be resident either as a special-purpose browser or as a browser extension or add-in of an already resident general-purpose browser. The educational enhancement agent, restricted browser, and browser extension or add-in, are each readily installable via the Internet or via portable storage media. According to a preferred configuration, the educational enhancement agent's primary function is to dynamically contact the educational enhancement website to indicate that the respective child client user is active, to notify the child that he/she has accrued time and may initiate or continue a computer-based leisure activity, to warn the child that the leisure activity period is about to end, and to activate the restricted web browser on command of the website, thereby restricting or interrupting the leisure activity. To this end, according to an embodiment of the present invention, the agent can listen for commands from the website for an order to dynamically interrupt the leisure activity or let the leisure activity resume. When the agent is commanded to interrupt the leisure activity, it can direct the browser to the website. When the leisure activity is to resume, the agent can release control of the child's computer on command from the website.

Various functions, such as timing of the leisure activity intervals, can be performed by the web server instead of a locally resident program. The benefit of such remote control is that remotely determined parameters, such as timing, cannot be readily manipulated (hacked) by the child. Such is not the case for devices using locally resident timing. Remote access control can also beneficially permit greater flexibility of the control parameters, the seamless upgrade of control parameters, and real-time control. Also beneficially, through use of the web server, configuration parameters can be remotely obtained, i.e., by the website where they are stored and used through a parent portal. This can allow configuration of those parameters remotely from the child's device, at any time, even while the child is using the play device, and can allow adding new configuration parameters at any time without the installation of additional software by the parent.

Further, beneficially, embodiments of the present invention specify a fundamentally different storage and delivery method for presenting educational tasks. Storing educational task items at the website level can afford substantially greater storage capacity and database management power. With these capabilities, such a centralized educational task database can allow categorically greater scale in number and variety of types of tasks, subject matters, and grade level and difficulty. The centralized database can also permit quality control of educational task content based on test scores over a large population, rather than relying only on the query creation skills of the parent. It can also permit continuous development of standardization criteria which allows assessment of child performance in comparison with appropriate populations of other children as grouped by age, geographic and other variables.

This application is related to PCT Application No. PCT/US08/52355 filed on Jan. 29, 2008, titled "System, Program Product, and Related Methods for Managing Child Activities"; U.S. Patent Application No. 60/914,803 filed on Apr. 30, 2007, titled "Pass2Play Service: Documentation 2007-04-24," and U.S. Patent Application No. 60/886,961 filed on Jan. 29, 2007, titled "Pass2Play," each incorporated herein by reference in its entirety.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification. For example, although the system description and method step description was primarily provided with respect to the exemplary system architecture shown in FIG. 1, other system architectures are within the scope of the present invention.

That claimed is:

1. A system for managing activities of a child over a communication network, the system comprising:
   a communication network;
   at least one computer hosting an online educational enhancement web site accessible to the communication network to define an educational enhancement web server, the educational enhancement web server having a processor and memory coupled to the processor to store operating instructions therein;
   at least one computer in communication with the educational enhancement web server to provide database management services thereto to define a database server, the database server having a processor and memory coupled to the processor;
   at least one database accessible to the processor of the database server and having a plurality of child client user records associated with a plurality of child client users, each child client user record associated with at least one parent client user;
   a plurality of child client user computers each positioned at a respective plurality of child client user sites remote from the educational enhancement web server and accessible to the communication network and having a processor and memory coupled to the processor to store operating instructions therein and to receive data from the educational enhancement web server, a display in communication with the processor to display data using an associated web browser, and a user interface in communication with the processor to provide the child client user with on-line web-based access to the educational enhancement web server over the communication network, the memory of each child client user computer also including an educational enhancement agent adapted to receive commands from the educational enhancement web server to interrupt or resume at least one application program adapted to provide a computer-based leisure activity;
   educational enhancement program product stored in the memory of the educational enhancement web server to facilitate managing activities of a child over a communication network, the educational enhancement program product including instructions that when executed by the educational enhancement web server, cause the educational enhancement web server to perform the operations of:
      receiving data from a child client user computer identifying a child client user,
      providing data to the child client user computer to display a first educational task required to be completed to allow access to at least one application program adapted to provide the respective child client user a computer-based leisure activity,
      providing data to direct the educational enhancement agent to allow access to the at least one application program responsive to child client user satisfaction of access criteria,
      providing data to direct the educational enhancement agent to interrupt the computer-based leisure activity to define an interrupt order responsive to a permissive access time limit,
      providing data to the child client user computer to display a second educational task required to be completed to allow access of the interrupted computer-based leisure activity, and
      providing data to direct the educational enhancement agent to resume the computer-based leisure activity responsive to child client user satisfaction of access criteria.

2. A system as defined in claim 1, wherein the at least one database further comprises a plurality of dynamically selectable educational task items organized by at least one of the following: grade or age of the child client user, subject matter, difficulty, task type, and performance on prior educational task items.

3. A system as defined in claim 1, wherein the child client user records include identification data, scholastic aptitude data, data identifying a set of a plurality of child client user authorized application programs selected by a parent client user and providing a computer-based leisure activity, permissive access criterion associated with each of the plurality of authorized application programs, and child client user task item completion and performance history.

4. A system as defined in claim 1,
   wherein each child client user computer displays a desktop, a web page window, or web page toolbar listing each child client user application program selectable to launch the respective at least one application program responsive to the respective child client user computer receiving access data;
   wherein the at least one of the application program includes a web-based game; and
   wherein the at least one database includes a list of uniform resource locators associated with the web-based game.

5. A system as defined in claim 1, wherein the operations further comprise monitoring expended permissive access time to thereby determine when to provide the data to direct the educational enhancement agent to interrupt the computer-based leisure activity.

6. A system as defined in claim 1,
   wherein the at least one application program includes at least one of the following: a plurality of authorized application programs providing a computer-based leisure activity or a plurality of instances of the same authorized application program; and
   wherein the operations further comprise monitoring usage time of each of the at least one application program to thereby determine when to provide the data to direct the educational enhancement agent to interrupt the computer-based leisure activity, and monitoring cumulative usage time of each active usage of each of at least one of the following: the plurality of authorized application programs or the plurality of instances of the same authorized application program to thereby prevent circumventing timed interruption of the computer-based leisure activity.

7. A system as defined in claim 1, wherein the educational enhancement agent provides data to initiate display of a warning to the child client user that the computer-based leisure activity is about to be interrupted to thereby allow the child to save associated application program data responsive to receiving the interrupt order.

8. A system as defined in claim 1,
wherein the operation of providing data to direct the educational enhancement agent to allow access to the at least one application program includes the operation of providing permissive access data to the child client user computer, the permissive access data including identification of the at least one application program to thereby allow child client user selection of the at least one application program, the at least one application program selected by a parent client user and adapted to provide the respective child client user the computer-based leisure activity; and
wherein the educational enhancement agent provides data to direct the child client user computer to receive and display an educational site webpage presenting a set of dynamically selected educational task items responsive to receiving the interrupt order.

9. A system as defined in claim 1,
wherein the operation of providing data to direct the educational enhancement agent to allow access to the at least one application program includes the operation of providing permissive access data to the child client user computer, the permissive access data including identification of the at least one application program to thereby allow child client user selection of the at least one application program, the at least one application program selected by a parent client user and adapted to provide the respective child client user the computer-based leisure activity; and
wherein the educational enhancement agent provides data to direct the child client user computer to receive and display an educational site webpage or webpage toolbar listing at least one available educational sites responsive to receiving the interrupt order.

10. A system as defined in claim 1, wherein the operations further comprise dynamically selecting educational task items from the at least one database responsive to the permissive access time limit, responsive to data stored in the child client user record for the respective child client user, and responsive to performance on prior educational task items.

11. A system as defined in claim 10,
wherein criteria for dynamically selecting the educational task items includes child client user personal profile data submitted by an associated parent client user and child client user task item completion and score history for the respective child client user; and
wherein educational task items added to the at least one database after an educational task has been provided to the child client user computer are made available for dynamic selection during the ongoing educational task.

12. A system as defined in claim 1, wherein the operations further comprise:
receiving educational task completion data for the educational task provided to the child client user;
evaluating educational task performance of the child client user responsive to completion of the educational task to determine if the respective child client user satisfied associated access criteria to thereby determine an amount of access time for additional computer-based leisure activities prior to a next interrupt;
storing completion and score data associated with the educational task; and
providing an associated parent client user real-time notification of the completion and the score of each educational task and child client user current status.

13. A system as defined in claim 1,
wherein the operations further comprise:
receiving computer-based leisure activity time limit criteria data defining permissive access data from an associated parent client user for the child client user,
receiving identification of the at least one application program during initial installation configuration and periodically thereafter, each application program adapted to provide the child client user a computer-based leisure activity,
associating the permissive access data with a child client user record for the child client user, the permissive access criteria including at least one of the following: a parent client user selected minimum passing score for test-based educational task items and a parent client user selected minimum educational web site access view time,
receiving subsequent real-time permissive access data updates from the associated parent client user for the child client users and
providing real-time permissive access update data to the educational enhancement agent; and
wherein the educational enhancement agent provides updated permissive access to the at least one application program responsive to the updated permissive access update data.

14. A system as defined in claim 1,
wherein the operations further comprise:
receiving computer-based leisure activity time limit criteria data defining permissive access data from an associated parent client user for the child client user,
associating the time limit criteria data with a child client user record for the child client user, the permissive access criteria including at least one of the following: a parent client user selected minimum passing score for test-based educational task items and a parent client user selected minimum educational web site access view time,
receiving subsequent real-time permissive access data updates from the associated parent client user for the child client user, and
providing real-time permissive access update data to the educational enhancement agent; and
wherein the educational enhancement agent terminates access to all application programs providing a computer-based leisure activity responsive to the permissive access update data.

15. A system as defined in claim 6, wherein the operations further comprise:
storing cumulative child client user access time individually for each of the at least one application programs and cumulative child client user access time for each educational site accessed by the respective child client user for at least one time period; and
providing a message link between a parent client user computer and an associated child client user computer when logged into the educational enhancement web server.

16. A computer program product, stored on a tangible computer memory media, operable on a computer to facilitate managing activities of a child over a communication network, the computer program product comprising:

an entry initiator adapted to access child client user records in at least one database to thereby provide user login access for and authentication of each of a plurality of child client users and to provide user login access for and authentication of each of a plurality of parent client users to allow entry of and access to data stored in associated child client user records, each parent client user associated with at least one of the plurality of child client users; and an interrupt manager adapted to access interrupt criteria for a child client user, to determine at least one of the following: cumulative expended leisure usage time or cumulative computer-based leisure activity application program run time, prior to a last interrupt, to initiate commands over a communication network to an educational enhancement agent residing on a child client user computer to interrupt one or more application programs responsive to the interrupt criteria, and to initiate commands to the educational enhancement agent to resume the one or more application programs responsive to satisfaction of associated permissive access criteria.

17. A computer program product as defined in claim 16, further comprising:

an educational task manager adapted to dynamically select a plurality of educational task items for assignment to the client child user responsive to the client child user's personal profile data submitted by the associated parent client user, task item completion and performance history data for the child client user, and responsive to the interrupt manager; and an educational task evaluation manager adapted to receive educational task completion data, to evaluate educational task performance of the child client user for each assigned educational task, and to determine if the child client user satisfied associated permissive access criteria to thereby determine an amount of resumption time for additional computer-based leisure activity prior to a next interrupt.

18. A computer program product as defined in claim 17, further comprising:

a program initiation manager adapted to present custom-configured web pages to the child client user computer to thereby welcome and orient the child client user and to instruct the child client user on how to execute the one or more required educational tasks; and an educational task completion and performance storage manager adapted to receive evaluation data from the educational task evaluation manager to thereby manage storing the child client user task item completion history and performance history in the at least one database.

19. A computer program product as defined in claim 18, further comprising an educational program reports manager adapted to provide online reporting of real-time child client user activity status of an associated child client user to a parent client user for an associated child client user, real-time child client user performance data on newly completed educational tasks, child client user task item completion and score history, child client user performance comparative statistics, and child client user computer-based leisure activity history, responsive to a real-time child client user milestone, on-demand request, or preselected periodic interval.

20. A computer program product as defined in claim 19, further comprising an educational program installation and maintenance manager adapted to provide answers to inquiries about the web-based educational enhancement program, subscribe the parent client user and associated child client user, manage installation of the educational enhancement agent, collect and store selection data providing customized educational tasks and performance based reward schedules selected by the parent client user for each separate associated child client user.

21. A method for managing activities of a child over a communication network, the method comprising the steps of:

receiving identification data through a communication network from a child client user computer identifying a respective child client user;

providing data through the communication network to the child client user computer to thereby display an educational task required to be completed to allow access to at least one application program adapted to provide the child client user a computer-based leisure activity; and directing an educational enhancement agent residing on a child client user computer through the communication network to allow access to the at least one application program responsive to child client user satisfaction of access criteria.

22. A method as defined in claim 21, further comprising the steps of:

receiving educational task completion data for the educational task provided to the child client user; and evaluating educational task performance of the child client user responsive to completion of the educational task to determine if the child client user satisfied associated access criteria to thereby determine an amount of permissive access time for computer-based leisure activities prior to a next interrupt.

23. A method as defined in claim 21, wherein the access criteria includes the child client user performing the educational task for a preselected time or obtaining at least a minimum passing score, and wherein the educational task is a first educational task, the method further comprising the steps of:

directing the educational enhancement agent through the communication network to interrupt the computer-based leisure activity to define an interrupt order responsive to a permissive access time limit;

providing data through the communication network to the child client user computer to thereby display a second educational task required to be completed to allow resumption of the interrupted computer-based leisure activity; and directing the educational enhancement agent through the communication network to resume the computer-based leisure activity responsive to child client user satisfaction of access criteria.

24. A method as defined in claim 21, further comprising the step of remotely monitoring expended permissive access time to thereby determine when to provide the data to direct the educational enhancement agent to interrupt the computer-based leisure activity.

25. A method as defined in claim 23, wherein the method further comprises the step of directing the child client user computer to receive and display at least one of the following: an educational site webpage presenting a set of dynamically selected educational task items, or an educational site webpage or webpage toolbar listing at least one available educational sites, responsive to receiving the interrupt order; and wherein the step of directing the educational enhancement agent to allow access to the at least one application program includes the step of providing permissive access data to the child client user computer, the permissive access data including identification of the at least one application program to thereby allow child client user selection of the at least one application program, the at least one application program selected by a parent client user and adapted to provide the respective child client user the computer-based leisure activity.

26. A method as defined in claim 23, further comprising the step of dynamically selecting educational task items from at least one database responsive to at least two of the following: the permissive access time limit, data stored in a child client user record for the respective child client user, and performance on prior educational task items by the child client user.

27. A method as defined in claim 26,
wherein criteria for dynamically selecting the educational task items includes child client user personal profile data submitted by an associated parent client user and child client user task item completion and performance history for the respective child client user; and
wherein educational task items added to the at least one database after an educational task has been provided to the child client user computer are made available for dynamic selection during an ongoing educational task being performed by the child client user.

28. A method as defined in claim 23, further comprising the steps of:
receiving computer-based leisure activity time limit criteria data defining permissive access data for the child client user from an associated parent client user through the communication network;
associating the time limit criteria data with a child client user record for the child client user, the permissive access criteria including at least one of the following: a parent client user selected minimum passing score for test-based educational task items, or a parent client user selected minimum educational web site access view time;
receiving subsequent real-time permissive access data updates from the associated parent client user for the child client user; and
providing real-time permissive access update data to the educational enhancement agent.

29. A method for managing activities of a child over a communication network, the method comprising the steps of:
directing an educational enhancement agent residing on a child client user computer through a communication network to interrupt an application program responsive to a permissive access time limit, the application program providing a respective child client user a computer-based leisure activity;
providing data through the communication network to the child client user computer to thereby display an educational task required to be completed to allow resumption of the interrupted computer-based leisure activity; and
directing the educational enhancement agent through the communication network to allow resumption of the computer-based leisure activity responsive to child client user satisfaction of access criteria.

30. A method as defined in claim 29, further comprising the steps of:
receiving educational task completion data for the educational task provided to the child client user;
evaluating educational task performance of the child client user responsive to completion of the educational task to determine if the child client user satisfied associated access criteria to thereby determine an amount of permissive access time for computer-based leisure activities prior to a next interrupt; and remotely monitoring expended permissive access time to thereby determine when to direct the educational enhancement agent through the communication network to interrupt the computer-based leisure activity.

31. A computer readable medium that is readable by a computer for managing activities of a child over a communication network, the computer readable medium comprising a set of instructions that, when executed by the computer, cause the computer to perform the following operations:
receiving data through a communication network from a child client user computer identifying a respective child client user;
providing data through the communication network to the child client user computer to display an educational task required to be completed to allow access to at least one application program adapted to provide the child client user a computer-based leisure activity; and
providing data through the communication network to direct an educational enhancement agent residing on a child client user computer to allow access to the at least one application program responsive to child client user satisfaction of access criteria.

32. A computer readable medium as defined in claim 31, wherein the operations further comprise:
receiving educational task completion data for the educational task provided to the child client user; and
evaluating educational task performance of the child client user responsive to completion of the educational task to determine if the child client user satisfied associated access criteria to thereby determine an amount of permissive access time for computer-based leisure activities prior to a next interrupt.

33. A computer readable medium as defined in claim 31, wherein the access criteria includes the child client user performing the educational task for a preselected time or obtaining at least a minimum passing score, wherein the educational task is a first educational task, and wherein the operations further comprise:
providing data through the communication network to direct the educational enhancement agent to interrupt the computer-based leisure activity to define an interrupt order responsive to a permissive access time limit;
providing data through the communication network to the child client user computer to display a second educational task required to be completed to allow resumption of the interrupted computer-based leisure activity; and
providing data through the communication network to direct the educational enhancement agent to resume the computer-based leisure activity responsive to child client user satisfaction of access criteria.

34. A computer readable medium as defined in claim 33, wherein the operations further comprise remotely monitoring expended permissive access time to thereby determine when to provide the data to direct the educational enhancement agent to interrupt the computer-based leisure activity.

35. A computer readable medium as defined in claim 33, wherein the operation of providing data through the communication network to direct the educational enhancement agent to allow access to the at least one application program includes the operation of providing permissive access data to the child client user computer, the permissive access data including identification of the at least one application program to thereby allow child client user selection of the at least one application program, the at least one application program selected by a parent client user and adapted to provide the respective child client user the computer-based leisure activity.

36. A computer readable medium as defined in claim 33, wherein the operations further comprise dynamically selecting educational task items from at least one database responsive to at least two of the following: the permissive access time limit, data stored in a child client user record for the respective child client user, and performance on prior educational task items by the child client user.

37. A computer readable medium as defined in claim 36,
wherein criteria for dynamically selecting the educational task items includes child client user personal profile data submitted by an associated parent client user and child client user task item completion and performance history for the respective child client user; and
wherein educational task items added to the at least one database after an educational task has been provided to the child client user computer are made available for dynamic selection during an ongoing educational task being performed by the child client user.

38. A computer readable medium as defined in claim 33, wherein the operations further comprise:
receiving computer-based leisure activity time limit criteria data defining permissive access data for the child client user from an associated parent client user through the communication network;
associating the time limit criteria data with a child client user record for the child client user, the permissive access criteria including at least one of the following: a parent client user selected minimum passing score for test-based educational task items, or a parent client user selected minimum educational web site access view time;
receiving subsequent real-time permissive access data updates from the associated parent client user for the child client user; and
providing real-time permissive access update data to the educational enhancement agent.

39. A computer readable medium that is readable by a computer for managing activities of a child over a communication network, the computer readable medium comprising a set of instructions that, when executed by the computer, cause the computer to perform the following operations:
providing data through a communication network to direct an educational enhancement agent residing on a child client user computer to interrupt an application program responsive to a permissive access time limit, the application program providing a respective child client user a computer-based leisure activity;
providing data through the communication network to the child client user computer to display an educational task required to be completed to allow resumption of the interrupted computer-based leisure activity; and
providing data through the communication to direct the educational enhancement agent to allow resumption of the computer-based leisure activity responsive to child client user satisfaction of access criteria.

40. A computer readable medium as defined in claim 39, wherein the operations further comprise:
receiving educational task completion data for the educational task provided to the child client user;
evaluating educational task performance of the child client user responsive to completion of the respective educational task to determine if the child client user satisfied associated access criteria to thereby determine an amount of permissive access time for computer-based leisure activities prior to a next interrupt; and
remotely monitoring expended permissive access time to thereby determine when to provide the data through the communication network to direct the educational enhancement agent to interrupt the computer-based leisure activity.

* * * * *